US012589731B2

(12) United States Patent
Suzuki et al.

(10) Patent No.: US 12,589,731 B2
(45) Date of Patent: Mar. 31, 2026

(54) IN-VEHICLE APPARATUS

(71) Applicant: SUBARU CORPORATION, Tokyo (JP)

(72) Inventors: Tomoaki Suzuki, Tokyo (JP); Kento Matsudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 44 days.

(21) Appl. No.: 18/817,407

(22) Filed: Aug. 28, 2024

(65) Prior Publication Data

US 2025/0074395 A1    Mar. 6, 2025

(30) Foreign Application Priority Data

Sep. 6, 2023    (JP) ................................. 2023-144196

(51) Int. Cl.
| | |
|---|---|
| *B60W 30/02* | (2012.01) |
| *B60W 10/04* | (2006.01) |
| *B60W 40/13* | (2012.01) |
| *G06V 20/50* | (2022.01) |

(52) U.S. Cl.
CPC ............ *B60W 30/02* (2013.01); *B60W 10/04* (2013.01); *B60W 40/13* (2013.01); *G06V 20/50* (2022.01); *B60W 2530/10* (2013.01); *G06V 2201/12* (2022.01)

(58) Field of Classification Search
CPC ... B60W 30/02; B60W 40/13; B60W 2530/10
See application file for complete search history.

(56) References Cited

U.S. PATENT DOCUMENTS

2009/0024310 A1 *    1/2009    Karrie ................... G01M 1/122
                                                                701/124

FOREIGN PATENT DOCUMENTS

DE        102011116195 A1 *    4/2013    ............. G01G 19/12
JP        2018-001944 A        1/2018

OTHER PUBLICATIONS

DE102011116195 (Year: 2013).*

* cited by examiner

*Primary Examiner* — Kito R Robinson
*Assistant Examiner* — Roy Rhee
(74) *Attorney, Agent, or Firm* — Rimon P.C.

(57) ABSTRACT

An in-vehicle apparatus includes a load weight information obtainer, a load information obtainer, an aerodynamic analyzer, a driving stability determiner, a control processor, and a proposer. The load weight information obtainer acquires a load weight of a load placed on a roof rail or a roof carrier of a vehicle. The load information obtainer acquires load information including a size and a shape of the load from image data on the load. The aerodynamic analyzer executes an aerodynamic analysis based on the load information. The driving stability determiner determines driving stability in travel of the vehicle based on the load weight and a result of the aerodynamic analysis. The control processor prohibits the vehicle from traveling when the driving stability is determined not to be sufficiently secured in the travel of the vehicle. The proposer proposes an appropriate loading way to place the load on the vehicle.

6 Claims, 19 Drawing Sheets

| FRONTAL PROJECTED AREA Sz [m²] | SIDE PROJECTED AREA Ss [m²] | LEVEL OF INCREASE IN AERODYNAMIC DRAG |
|---|---|---|
| Sz > A | Ss > E | LEVEL 1 |
| A ≤ Sz < B | E ≤ Ss < F | LEVEL 2 |
| B ≤ Sz < C | F ≤ Ss < G | LEVEL 3 |
| C ≤ Sz < D | G ≤ Ss < H | LEVEL 4 |
| D ≤ Sz | H ≤ Sz | LEVEL 5 |

FIG. 4

| RESULT OF ANALYSIS BY AERODYNAMIC ANALYZER 13: LEVEL OF INCREASE IN AERODYNAMIC DRAG | DETERMINATION OF DRIVING STABILITY |
|---|---|
| LEVEL 1 | SECURED |
| LEVEL 2 | SECURED |
| LEVEL 3 | SECURED |
| LEVEL 4 | NOT SECURED |
| LEVEL 5 | NOT SECURED |

FIG. 5A

| LOAD WEIGHT [kg] | DETERMINATION OF DRIVING STABILITY |
|---|---|
| LESS THAN X [kg] | SECURED |
| GREATER THAN OR EQUAL TO X [kg] | NOT SECURED |

FIG. 5B

| FRONTAL PROJECTED AREA Sz [m²] | LEVEL OF DETERIORATION IN SPECIFIC POWER CONSUMPTION | EXAMPLE OF LOAD |
|---|---|---|
| Sz > J | LEVEL 1 | OBJECT PLACED IN ROOF BOX |
| J ≤ Sz < K | LEVEL 2 | OBJECT SUCH AS SKI BOARD PLACED ON ROOF CARRIER |
| K ≤ Sz < L | LEVEL 3 | OBJECT SUCH AS SURF BOARD PLACED ON ROOF CARRIER |
| L ≤ Sz < M | LEVEL 4 | OBJECT SUCH AS BICYCLE PLACED ON ROOF CARRIER |
| M ≤ Sz | LEVEL 5 | OBJECT SUCH AS BOAT |

FIG. 9A

| SIDE PROJECTED AREA Ss [m²] | ADJUSTMENT VALUE FOR LEVEL OF DETERIORATION |
|---|---|
| Ss > N | NO ADJUSTMENT: LEVEL OF DETERIORATION IN SPECIFIC POWER CONSUMPTION DETERMINED BASED ON FRONTAL PROJECTED AREA Sz |
| N ≤ Ss | +1 LEVEL (INCREASE LEVEL OF DETERIORATION IN SPECIFIC POWER CONSUMPTION DETERMINED BASED ON FRONTAL PROJECTED AREA Sz BY ONE LEVEL) |

FIG. 9B

| RESULT OF ANALYSIS BY AERODYNAMIC ANALYZER 13A: LEVEL OF DETERIORATION IN SPECIFIC POWER CONSUMPTION | RATE OF DETERIORATION IN SPECIFIC POWER CONSUMPTION [%] |
|---|---|
| LEVEL 1 | $\alpha_1$ |
| LEVEL 2 | $\alpha_2$ |
| LEVEL 3 | $\alpha_3$ |
| LEVEL 4 | $\alpha_4$ |
| LEVEL 5 | $\alpha_5$ |

FIG. 10A

| REFERENCE SPECIFIC POWER CONSUMPTION | X km/kwh |
|---|---|
| RATE OF DETERIORATION IN SPECIFIC POWER CONSUMPTION PER LOAD WEIGHT | Y %/kg |

FIG. 10B

IN-VEHICLE APPARATUS

CROSS-REFERENCE TO RELATED APPLICATIONS

The present application claims priority from Japanese Patent Application No. 2023-144196 filed on Sep. 6, 2023, the entire contents of which are hereby incorporated by reference.

BACKGROUND

The disclosure relates to an in-vehicle apparatus.

A load unloadable in a vehicle compartment or a trunk of a vehicle is placed on a roof carrier of the vehicle before traveling of the vehicle, in some cases.

A user who drives the vehicle finds it difficult to perceive the load placed on the roof carrier. A technique is thus proposed that detects the load placed on the vehicle while the vehicle is traveling.

For example, Japanese Unexamined Patent Application Publication (JP-A) No. 2018-001944 discloses a technique that detects a state of the load with a sensor disposed on the roof carrier.

SUMMARY

An aspect of the disclosure provides an in-vehicle apparatus to be applied to a vehicle. The in-vehicle apparatus includes a load weight information obtainer, a load information obtainer, an aerodynamic analyzer, a driving stability determiner, a control processor, and a proposer. The load weight information obtainer is configured to acquire a load weight of a load placed on a roof rail or a roof carrier of the vehicle. The load information obtainer is configured to acquire load information including a size and a shape of the load from image data on the load. The aerodynamic analyzer is configured to execute an aerodynamic analysis based on the load information acquired by the load information obtainer. The driving stability determiner is configured to determine driving stability in travel of the vehicle based on at least the load weight and a result of the aerodynamic analysis executed by the aerodynamic analyzer. The control processor is configured to perform control adapted to prohibit the vehicle from traveling when the driving stability determiner determines that the driving stability is not to be sufficiently secured in the travel of the vehicle. The proposer is configured to give a proposal on an appropriate loading way to place the load on the vehicle.

An aspect of the disclosure provides an in-vehicle apparatus to be applied to a vehicle. The in-vehicle apparatus includes one or more processors and one or more memories communicably coupled to the one or more processors. The one or more processors are configured to acquire a load weight of a load placed on a roof rail or a roof carrier of the vehicle, acquire load information including a size and a shape of the load from image data on the load, execute an aerodynamic analysis based on the load information, determine driving stability in travel of the vehicle based on at least the load weight and a result of the aerodynamic analysis, perform control adapted to prohibit the vehicle from traveling when the driving stability is determined not to be sufficiently secured in the travel of the vehicle, and propose an appropriate loading way to place the load on the vehicle.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIG. 4 is a table describing preset information stored in a memory of the in-vehicle apparatus illustrated in FIG. 1.

FIG. 5A is a table describing the preset information stored in the memory of the in-vehicle apparatus illustrated in FIG. 1.

FIG. 5B is a table describing the preset information stored in the memory of the in-vehicle apparatus illustrated in FIG. 1.

FIG. 9A is a table describing present information stored in a memory of the in-vehicle apparatus illustrated in FIG. 7.

FIG. 9B is a table describing present information stored in a memory of the in-vehicle apparatus illustrated in FIG. 7.

FIG. 10A is a table describing the preset information stored in the memory of the in-vehicle apparatus illustrated in FIG. 7.

FIG. 10B is a table describing the preset information stored in the memory of the in-vehicle apparatus illustrated in FIG. 7.

DETAILED DESCRIPTION

Figure 1:
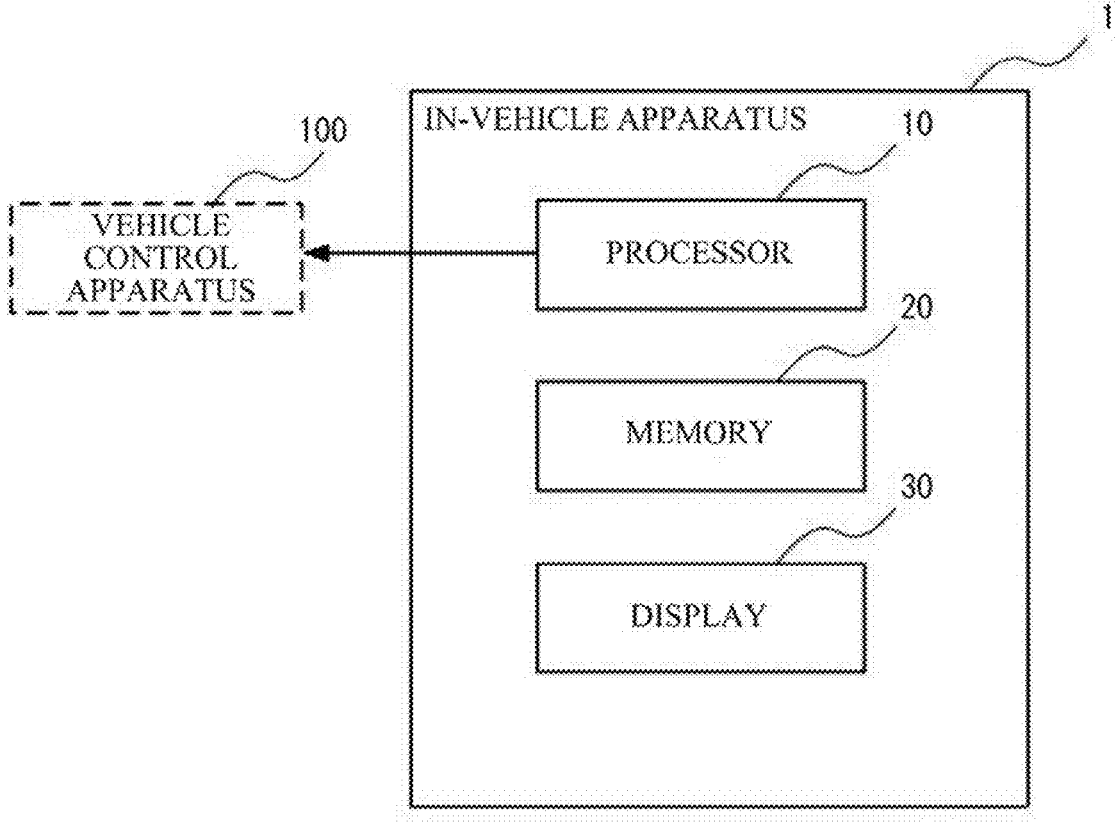
FIG. 1 is a block diagram illustrating a configuration of an in-vehicle apparatus according to one example embodiment of the disclosure.

A technique described in JP-A No. 2018-001944 fails to detect the size and weight of a load; therefore, it is difficult for the technique to detect the level of deterioration in driving stability of a vehicle when the vehicle starts traveling with the load placed on a roof carrier of the vehicle.

It is desirable to provide an in-vehicle apparatus that provides a user with the level of deterioration in driving stability of a vehicle by detecting the size and weight of a load placed on a roof carrier or the like of the vehicle.

In the following, some example embodiments of the disclosure are described in detail with reference to FIGS. 1 to 20. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

An in-vehicle apparatus 1 according to a first example embodiment of the disclosure will now be described with reference to FIGS. 1 to 6.
<Configuration of In-Vehicle Apparatus 1>
As illustrated in FIG. 1, the in-vehicle apparatus 1 according to the first example embodiment may include a processor 10, a memory 20, and a display 30.

In the first example embodiment, the processor 10 determines driving stability of a vehicle including the in-vehicle apparatus 1, based on information on a load placed on a roof rail or a roof carrier of the vehicle.

In the first example embodiment, when determining that the driving stability is not to be sufficiently secured in travel of the vehicle, for example, the processor 10 causes a vehicle control apparatus 100 to execute control adapted to prohibit the vehicle from traveling.

When determining that the driving stability is not to be sufficiently secured in the travel of the vehicle, for example, the processor 10 may send an instruction to prohibit the vehicle from traveling to the vehicle control apparatus 100.

In the first example embodiment, when determining that the driving stability is not to be sufficiently secured in the travel of the vehicle, for example, the processor 10 proposes an appropriate way to load the load (hereinafter referred to as a loading way).

In the first example embodiment, when determining that the driving stability is not to be sufficiently secured in the travel of the vehicle, for example, the processor 10 may cause the display 30, which will be described later, to display an error message and information on an appropriate loading way.

A configuration of the processor 10 will be described later.

The memory 20 may include a non-illustrated read only memory (ROM) and a non-illustrated random access memory (RAM).

For example, the memory 20 may store a control program and various kinds of data received from the processor 10.

In the first example embodiment, the memory 20 may preliminarily store, for example, preset information to which the processor 10 refers when determining the driving stability in the travel of the vehicle.

The preset information will be described later.

The display 30 may be, for example, a display panel such as a liquid crystal display, and may display information received from the processor 10.

Figure 2:
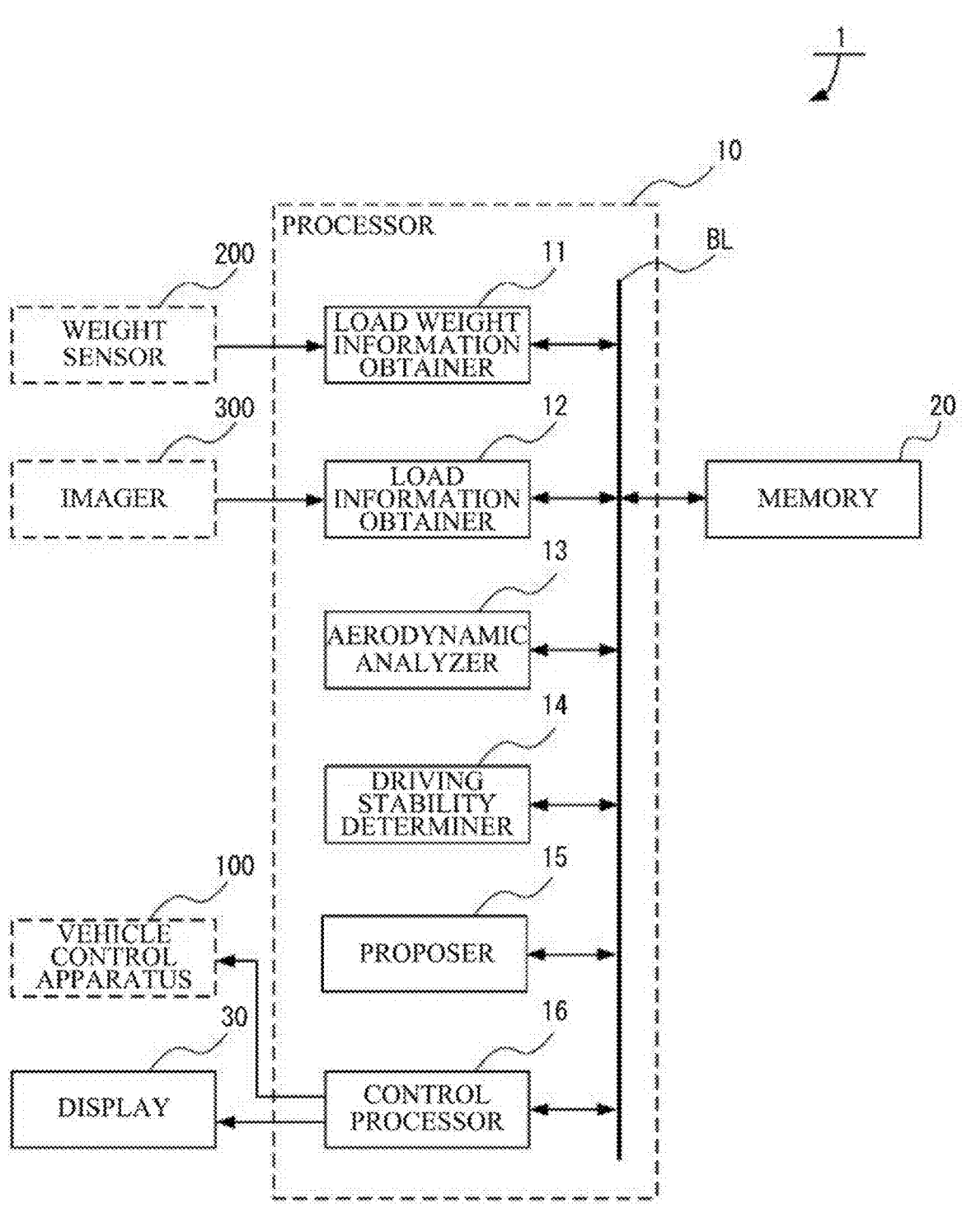
FIG. 2 is a block diagram illustrating a configuration of a processor in the in-vehicle apparatus illustrated in FIG. 1.

In some embodiments, the display 30 may be a display panel of a navigator 150, for example.
<Configuration of Processor 10>
As illustrated in FIG. 2, the processor 10 includes a load weight information obtainer 11, a load information obtainer 12, an aerodynamic analyzer 13, a driving stability determiner 14, a proposer 15, and a control processor 16.

These components of the processor 10 and the memory 20 may transmit and receive various kinds of data therebetween via a bus line BL.

The load weight information obtainer 11 acquires a load weight of the load placed on the roof rail or the roof carrier of the vehicle including the in-vehicle apparatus 1 according to the first example embodiment.

For example, the load weight information obtainer 11 may acquire the load weight of the load based on a sensor output from a weight sensor 200 disposed on the roof rail or the roof carrier.

The load weight information obtainer 11 may transmit the acquired load weight to the control processor 16, which will be described later, via the bus line BL.

The load information obtainer 12 acquires the size and shape of the load from image data.

For example, the load information obtainer 12 may acquire information on the size and shape of the load from image data of the load captured by one or more imagers 300 fixed to the vehicle.

Hereinafter, the information acquired by the load information obtainer 12 may be collectively referred to as "load information".

The load information obtainer 12 may transmit the acquired load information to the control processor 16, which will be described later, via the bus line BL.

The aerodynamic analyzer 13 executes an aerodynamic analysis based on the load information acquired by the load information obtainer 12.

An example of the aerodynamic analysis will now be described.

Figure 3A:
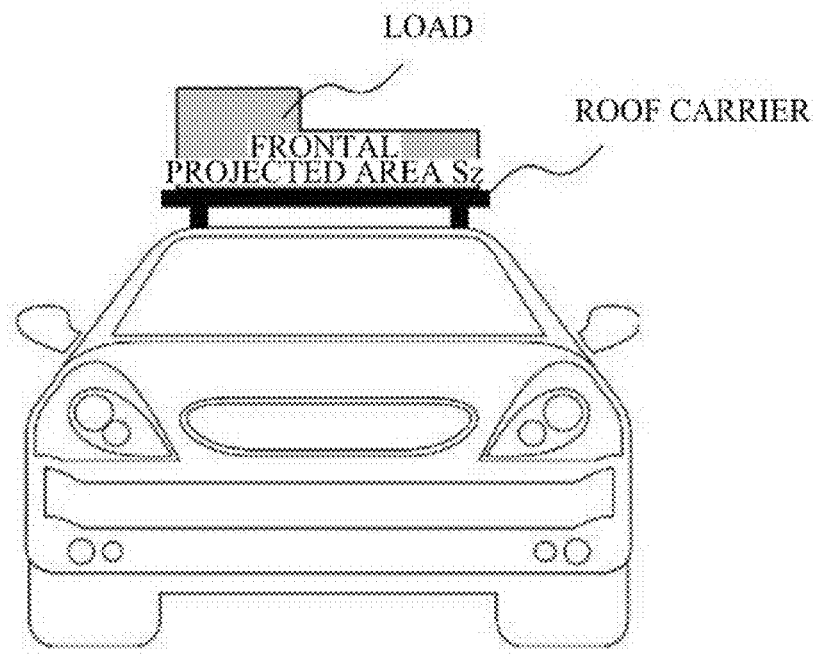
FIG. 3A is a diagram illustrating a frontal projected area calculated by the in-vehicle apparatus illustrated in FIG. 1.
Figure 3B:
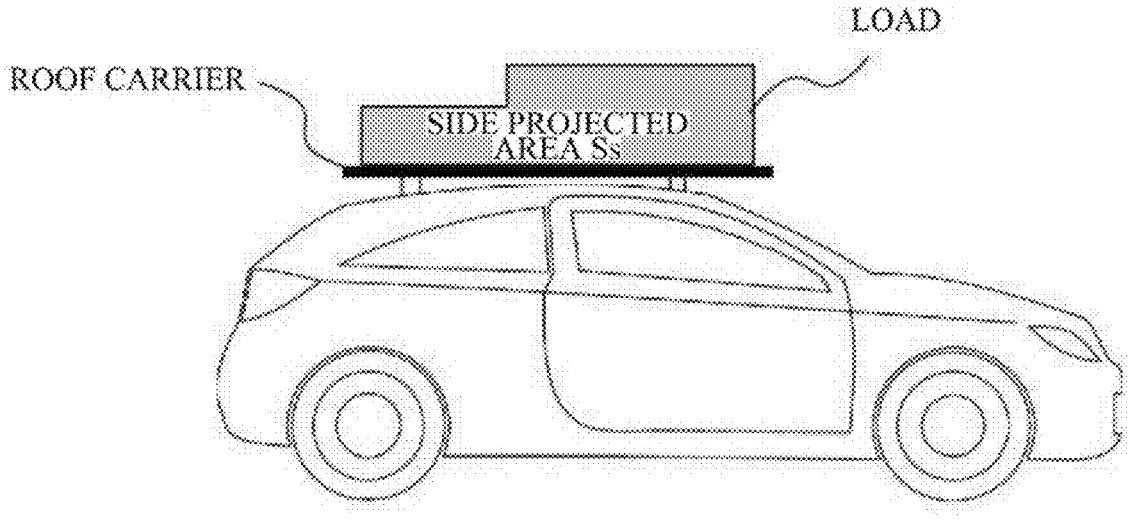
FIG. 3B is a diagram illustrating a side projected area calculated by the in-vehicle apparatus illustrated in FIG. 1.

In the first example embodiment, the aerodynamic analyzer 13 may calculate a frontal projected area Sz and a side projected area Ss of the load based on the load information acquired by the load information obtainer 12, as illustrated in FIGS. 3A and 3B, for example.

In the first example embodiment, the aerodynamic analyzer 13 may determine the level of increase in aerodynamic drag based on the calculated frontal projected area Sz and the calculated side projected area Ss, for example.

The aerodynamic analyzer 13 may determine the level of increase in aerodynamic drag based on preset information illustrated in FIG. 4, for example.

The preset information may include a correlation between the frontal projected area Sz and the level of increase in aerodynamic drag, and a correlation between the side projected area Ss and the level of increase in aerodynamic drag.

When the frontal projected area Sz is calculated to be smaller than A (m$^2$), for example, the aerodynamic analyzer 13 may determine the level of increase in aerodynamic drag to be Level 1.

When the side projected area Ss is calculated to be larger than or equal to H (m²), for example, the aerodynamic analyzer 13 may determine the level of increase in aerodynamic drag to be Level 5.

The aerodynamic analyzer 13 may compare the level of increase in aerodynamic drag determined based on the frontal projected area Sz and the level of increase in aerodynamic drag determined based on the side projected area Ss, and determine a higher one of the levels to be the level of increase in aerodynamic drag of the vehicle, for example.

When the level of increase in aerodynamic drag is determined to be Level 1 based on the frontal projected area Sz and the level of increase in aerodynamic drag is determined to be Level 5 based on the side projected area Ss, for example, the aerodynamic analyzer 13 may determine the level of increase in aerodynamic drag of the vehicle to be Level 5.

The aerodynamic analyzer 13 may transmit the level of increase in aerodynamic drag to the control processor 16, which will be described later, via the bus line BL.

The driving stability determiner 14 determines the driving stability in the travel of the vehicle based on at least the load weight acquired by the load weight information obtainer 11 and a result of the analysis by the aerodynamic analyzer 13.

An exemplary method of determining the driving stability will now be described.

The driving stability determiner 14 may determine the driving stability based on preset information illustrated in FIGS. 5A and 5B, for example.

In the first example embodiment, the driving stability determiner 14 may determine whether the driving stability is to be sufficiently secured based on the level of increase in aerodynamic drag determined by the aerodynamic analyzer 13, for example.

When the level of increase in aerodynamic drag is determined to be Level 4 or 5, for example, the driving stability determiner 14 may determine that the driving stability is not to be sufficiently secured.

When the load weight is greater than or equal to X (kg), the driving stability determiner 14 may determine that the driving stability is not to be sufficiently secured.

When determining that the driving stability is not to be sufficiently secured in one or both of the determination based on the level of increase in aerodynamic drag and the determination based on the load weight, the driving stability determiner 14 may determine that the driving stability is not to be sufficiently secured.

The driving stability determiner 14 may send a determination result to the control processor 16, which will be described later, via the bus line BL.

The proposer 15 proposes an appropriate loading way.

In the first example embodiment, the proposer 15 may determine the appropriate loading way based on the load weight and the load information, for example.

An example of the method of determining the appropriate loading way will now be described.

In the first example embodiment, when the load weight is greater than or equal to X (kg), for example, the proposer 15 may give a proposal on a reduction of the load weight to less than X (kg).

In the first example embodiment, the proposer 15 may calculate the loading way to minimize the frontal projected area Sz and the side projected area Ss, based on the size of the load acquired by the load information obtainer 12, for example.

In the first example embodiment, the proposer 15 may transmit information on the appropriate loading way to the control processor 16, which will be described later, via the bus line BL, for example.

The control processor 16 may control an overall operation of the in-vehicle apparatus 1 in accordance with a control program stored in the memory 20.

In the first example embodiment, the control processor 16 may send an instruction to acquire the load weight of the load to the load weight information obtainer 11 via the bus line BL, for example.

In the first example embodiment, the control processor 16 may send an instruction to acquire the load information to the load information obtainer 12 via the bus line BL, for example.

In the first example embodiment, the control processor 16 may transmit the load information received from the load information obtainer 12 to the aerodynamic analyzer 13 via the bus line BL, for example, to cause the aerodynamic analyzer 13 to execute the aerodynamic analysis.

In the first example embodiment, the control processor 16 may transmit the load weight of the load received from the load weight information obtainer 11 and the result of the analysis by the aerodynamic analyzer 13 to the driving stability determiner 14 via the bus line BL, for example, to cause the driving stability determiner 14 to determine the driving stability in the travel of the vehicle.

In the first example embodiment, when receiving, from the driving stability determiner 14, the result of the determination indicating that the driving stability is not to be sufficiently secured in the travel of the vehicle, for example, the control processor 16 performs control adapted to prohibit the vehicle from traveling.

When receiving, from the driving stability determiner 14, the result of the determination indicating that the driving stability is not to be sufficiently secured in the travel of the vehicle, for example, the control processor 16 may send the instruction to prohibit the vehicle from traveling to the vehicle control apparatus 100.

In the first example embodiment, when receiving, from the driving stability determiner 14, the result of the determination indicating that the driving stability is not to be sufficiently secured in the travel of the vehicle, for example, the control processor 16 may transmit the load weight and the load information to the proposer 15 via the bus line BL to cause the proposer 15 to propose the appropriate loading way.

In the first example embodiment, the control processor 16 may execute control to cause the display 30 to display information.

In the first example embodiment, when receiving, from the driving stability determiner 14, the result of the determination indicating that the driving stability is not to be sufficiently secured in the travel of the vehicle, the control processor 16 may cause the display 30 to display an error message and the information on the appropriate loading way, for example.

When receiving, from the driving stability determiner 14, the result of the determination indicating that the driving stability is not to be sufficiently secured in the travel of the vehicle, for example, the control processor 16 may cause the display 30 to display an error message indicating "The load can fall from the vehicle if you drive the vehicle with the load being placed on the vehicle in a current manner. Reload the load referring to the appropriate loading way."

For example, the control processor 16 may cause the display 30 to display the information on the appropriate loading way received from the proposer 15.

For example, the control processor 16 may cause the display 30 to display image data indicating respective loading positions of loads.

When the load weight is greater than or equal to X (kg), for example, the control processor 16 may cause the display 30 to display an error message indicating "The load weight is too heavy. If you drive the vehicle in this state, the vehicle can cause a rollover accident. Reduce the load weight."

<Loading Way Proposing Process by In-Vehicle Apparatus 1>

Figure 6:
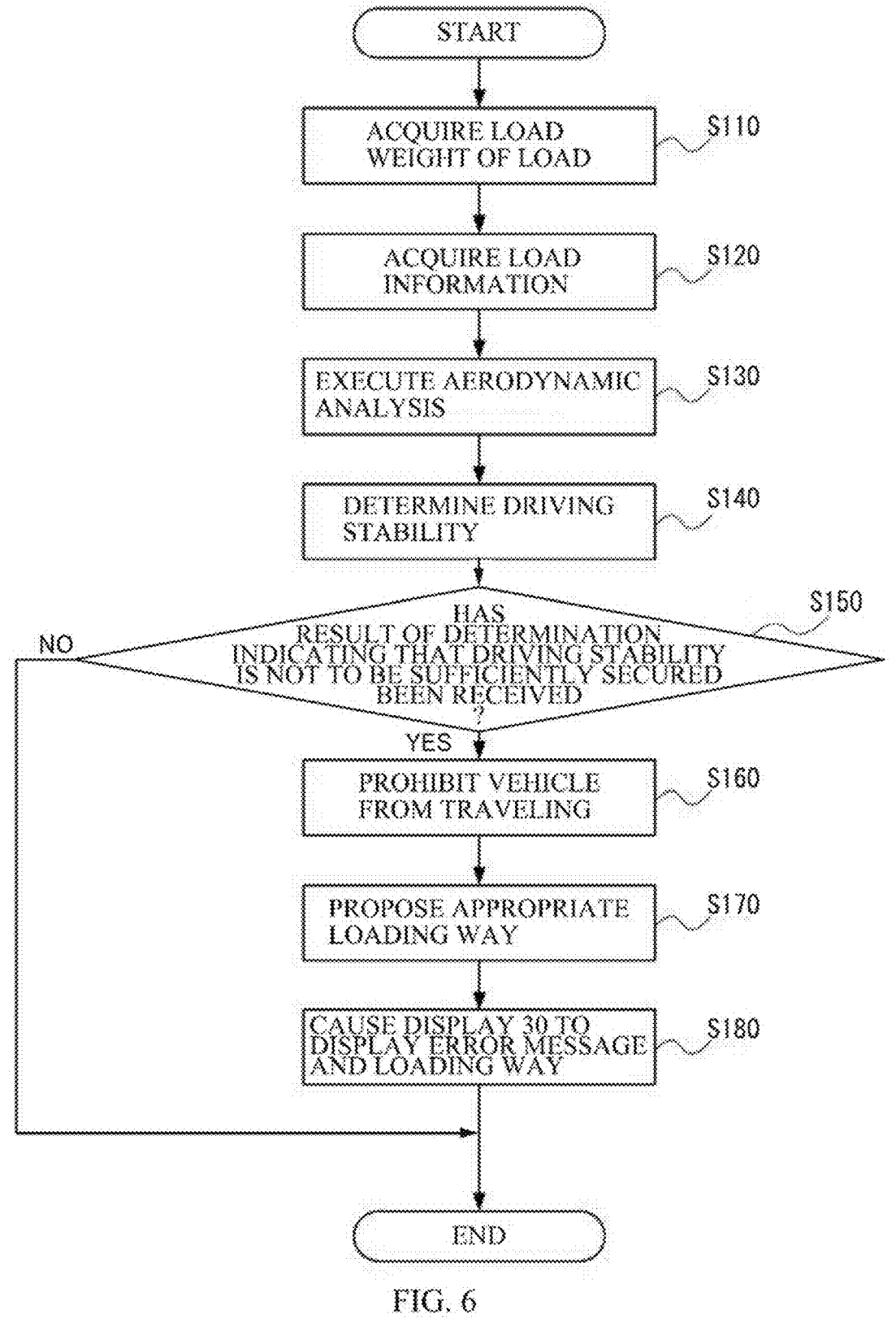
FIG. 6 is a flowchart of a process to be performed by the in-vehicle apparatus illustrated in FIG. 1.

A process adapted to propose the loading way to be performed by the in-vehicle apparatus 1 according to the first example embodiment will now be described with reference to FIG. 6.

The control processor 16 may send the instruction to acquire the load weight of the load to the load weight information obtainer 11 to cause the load weight information obtainer 11 to acquire the load weight of the load (Step S110).

The control processor 16 may send the instruction to acquire the load information to the load information obtainer 12 to cause the load information obtainer 12 to acquire the load information (Step S120).

The control processor 16 may transmit the load information acquired in Step S120 to the aerodynamic analyzer 13 to cause the aerodynamic analyzer 13 to execute the aerodynamic analysis (Step S130).

The control processor 16 may transmit the load weight acquired in Step S110 and the result of the aerodynamic analysis acquired in Step S130 to the driving stability determiner 14 to cause the driving stability determiner 14 to determine the driving stability (Step S140).

The control processor 16 may determine whether the result of the determination indicating that the driving stability is not to be sufficiently secured in the travel of the vehicle has been received from the driving stability determiner 14 (Step S150).

When determining that the result of the determination indicating that the driving stability is not to be sufficiently secured in the travel of the vehicle has not been received from the driving stability determiner 14 (Step S150: NO), the control processor 16 may end the process.

When determining that the result of the determination indicating that the driving stability is not to be sufficiently secured in the travel of the vehicle has been received from the driving stability determiner 14 (Step S150: YES), the control processor 16 may cause the process to proceed to Step S160.

The control processor 16 may send the instruction to prohibit the vehicle from traveling to the vehicle control apparatus 100 (Step S160).

The control processor 16 may transmit the load weight acquired in Step S110 and the load information acquired in Step S120 to the proposer 15 to cause the proposer 15 to execute the process to propose the appropriate loading way (Step S170).

The control processor 16 may cause the display 30 to display the error message and the information on the appropriate loading way received from the proposer 15 (Step S180), and end the process.

Workings and Effects

As described above, the in-vehicle apparatus 1 according to the first example embodiment includes the load weight information obtainer 11, the load information obtainer 12, the aerodynamic analyzer 13, the driving stability determiner 14, the control processor 16, and the proposer 15. The load weight information obtainer 11 acquires the load weight of the load. The load information obtainer 12 acquire the size and shape of the load from the image data. The aerodynamic analyzer 13 executes the aerodynamic analysis based on the acquired load information. The driving stability determiner 14 determines the driving stability in the travel of the vehicle based on at least the load weight and the result of the analysis by the aerodynamic analyzer 13. When determining that the driving stability is determined not to be secured in the travel of the vehicle, the control processor performs the control adapted to prohibit the vehicle from traveling. The proposer 15 proposes an appropriate loading way.

That is, the in-vehicle apparatus 1 determines the driving stability in the travel of the vehicle based on the load weight of the load and the load information, and performs the control adapted to prohibit the vehicle from traveling when determining that the driving stability is not to be sufficiently secured.

Accordingly, the in-vehicle apparatus 1 prohibits the vehicle from traveling when the driving stability is not to be sufficiently secured. It is therefore possible to avoid the occurrence of a collapse or a fall of the load and the occurrence of a rollover accident of the vehicle, for example.

In the first example embodiment, the aerodynamic analyzer 13 of the in-vehicle apparatus 1 may determine the level of increase in aerodynamic drag based on the frontal projected area Sz and the side projected area Ss of the load, for example.

The aerodynamic analyzer 13 therefore makes it possible to accurately determine the level of increase in aerodynamic drag.

In the first example embodiment, the driving stability determiner 14 of the in-vehicle apparatus 1 may determine whether the driving stability is to be sufficiently secured based on the load weight of the load acquired from the load weight information obtainer 11 and the level of increase in aerodynamic drag acquired from the aerodynamic analyzer 13.

The driving stability determiner 14 therefore makes it possible to accurately determine whether the driving stability is to be sufficiently secured.

In the first example embodiment, the control processor 16 of the in-vehicle apparatus 1 may cause the display 30 to display an error message when receiving the result of the determination indicating that the driving stability is not to be sufficiently secured from the driving stability determiner 14.

The in-vehicle apparatus 1 therefore makes it possible to make the user recognize that the loading way is inappropriate.

In the first example embodiment, the in-vehicle apparatus 1 may cause the display 30 to display the appropriate loading way when the driving stability is determined not to be secured in the travel of the vehicle.

That is, the in-vehicle apparatus 1 may propose the loading way that allows the vehicle to travel stably to the user based on the load weight and the load information.

This allows all users to place the load on the vehicle in accordance with the safe loading way.

It is therefore possible for the in-vehicle apparatus 1 to avoid the occurrence of a collapse or a fall of the load and the occurrence of a rollover accident of the vehicle.

Placing the load on the vehicle in accordance with the safe loading way ensures safe travel for the user.

Second Example Embodiment

An in-vehicle apparatus 1A according to a second example embodiment will now be described with reference to FIGS. 7 to 11.

Note that elements denoted with the same reference numerals as those in the first example embodiment have the same functions as those in the first example embodiment, and a detailed description thereof is thus omitted herein.

<Configuration of In-Vehicle Apparatus 1A>

Figure 7:
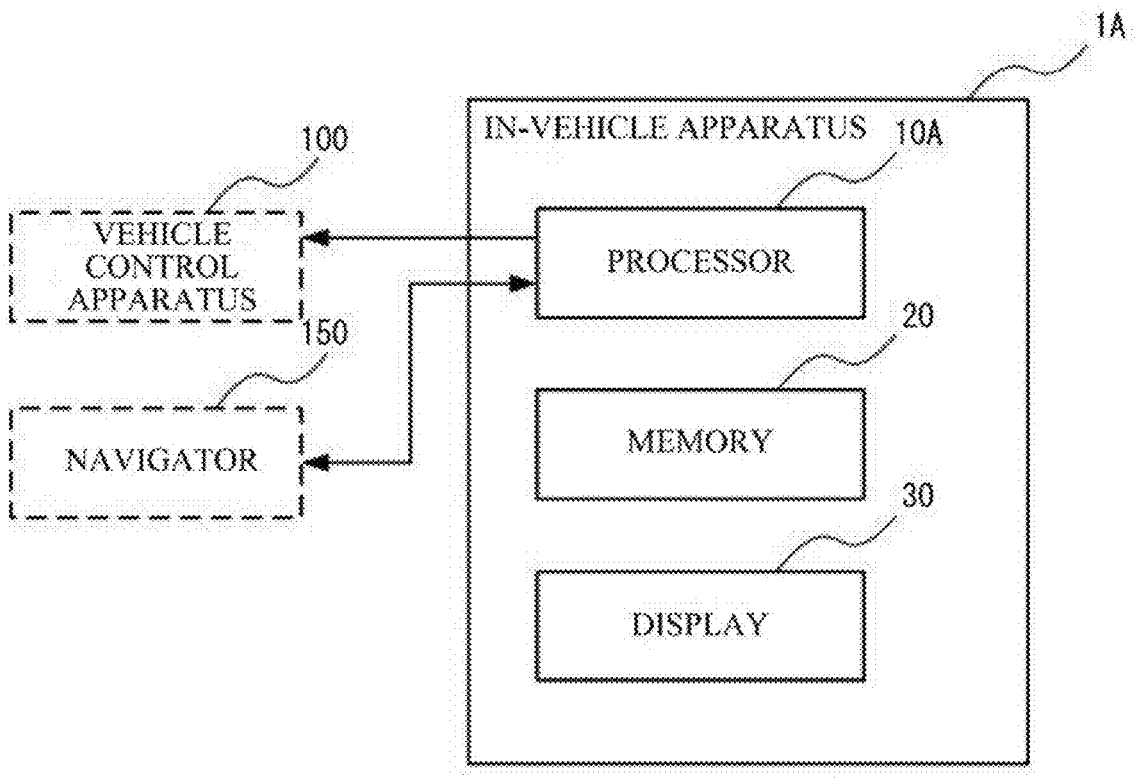
FIG. 7 is a block diagram illustrating a configuration of an in-vehicle apparatus according to one example embodiment of the disclosure.

As illustrated in FIG. 7, the in-vehicle apparatus 1A may include a processor 10A, the memory 20, and the display 30.

In the second example embodiment, the processor 10A determines the driving stability of the vehicle based on information on a load placed on a roof rail or a roof carrier of a vehicle including the in-vehicle apparatus 1A.

In the second example embodiment, when determining that the driving stability is not to be sufficiently secured in the travel of the vehicle, for example, the processor 10A may cause the vehicle control apparatus 100 to execute the control adapted to prohibit the vehicle from traveling.

When determining that the driving stability is not to be sufficiently secured in the travel of the vehicle, for example, the processor 10A may send the instruction to prohibit the vehicle from traveling to the vehicle control apparatus 100.

In the second example embodiment, when determining that the driving stability is not to be sufficiently secured in the travel of the vehicle, for example, the processor 10A may propose an appropriate loading way.

In the second example embodiment, when determining that the driving stability is not to be sufficiently secured in the travel of the vehicle, for example, the processor 10A may cause the display 30 to display an error message and the information on the appropriate loading way.

In the second example embodiment, the processor 10A may determine whether the loading way has been improved, for example.

In the second example embodiment, when determining that the loading way has been improved, the processor 10A may calculate a specific power consumption of the vehicle, for example.

In the second example embodiment, the processor 10A may acquire information on a departure point and a destination from the navigator 150, for example.

In the second example embodiment, the processor 10A may retrieve route information including a charging timing in travel from the departure point to the destination, based on a current amount of charge and the calculated specific power consumption, for example.

In the second example embodiment, the processor 10A may retrieve a traveling route that avoids contact between the vehicle on which the load is placed in a current state and a planimetric feature such as a tunnel, an electric wire, or a roadside tree, for example.

In the second example embodiment, the processor 10A may transmit the retrieved route information to the navigator 150.

In the second example embodiment, when receiving the route information from the processor 10A, the navigator 150 may execute route guidance from the departure point to the destination and guidance on power charging based on the route information received from the processor 10A.

A configuration of the processor 10A will be described later.

The memory 20 may include a non-illustrated read only memory (ROM) and a non-illustrated random access memory (RAM).

For example, the memory 20 may store a control program and various kinds of data received from the processor 10A.

In the second example embodiment, the memory 20 may preliminarily store, for example, map information and information on locations of power charging facilities.

The map information may include, for example, data on roads and data on the height of the planimetric feature, such as the height of contact with a tunnel, the height of contact with an electric wire or a cable, or the height of contact with a roadside tree, that are used to determine the traveling route.

In the second example embodiment, the memory 20 may preliminarily store, for example, the preset information to which the processor 10A refers when determining the driving stability in the travel of the vehicle.

In the second example embodiment, the memory 20 may preliminarily store, for example, the preset information to which the processor 10A refers when determining the level of deterioration in specific power consumption due to the load.

In the second example embodiment, the memory 20 may preliminarily store, for example, the preset information to which the processor 10A refers when calculating the specific power consumption.

The preset information will be described later.

<Configuration of Processor 10A>

Figure 8:
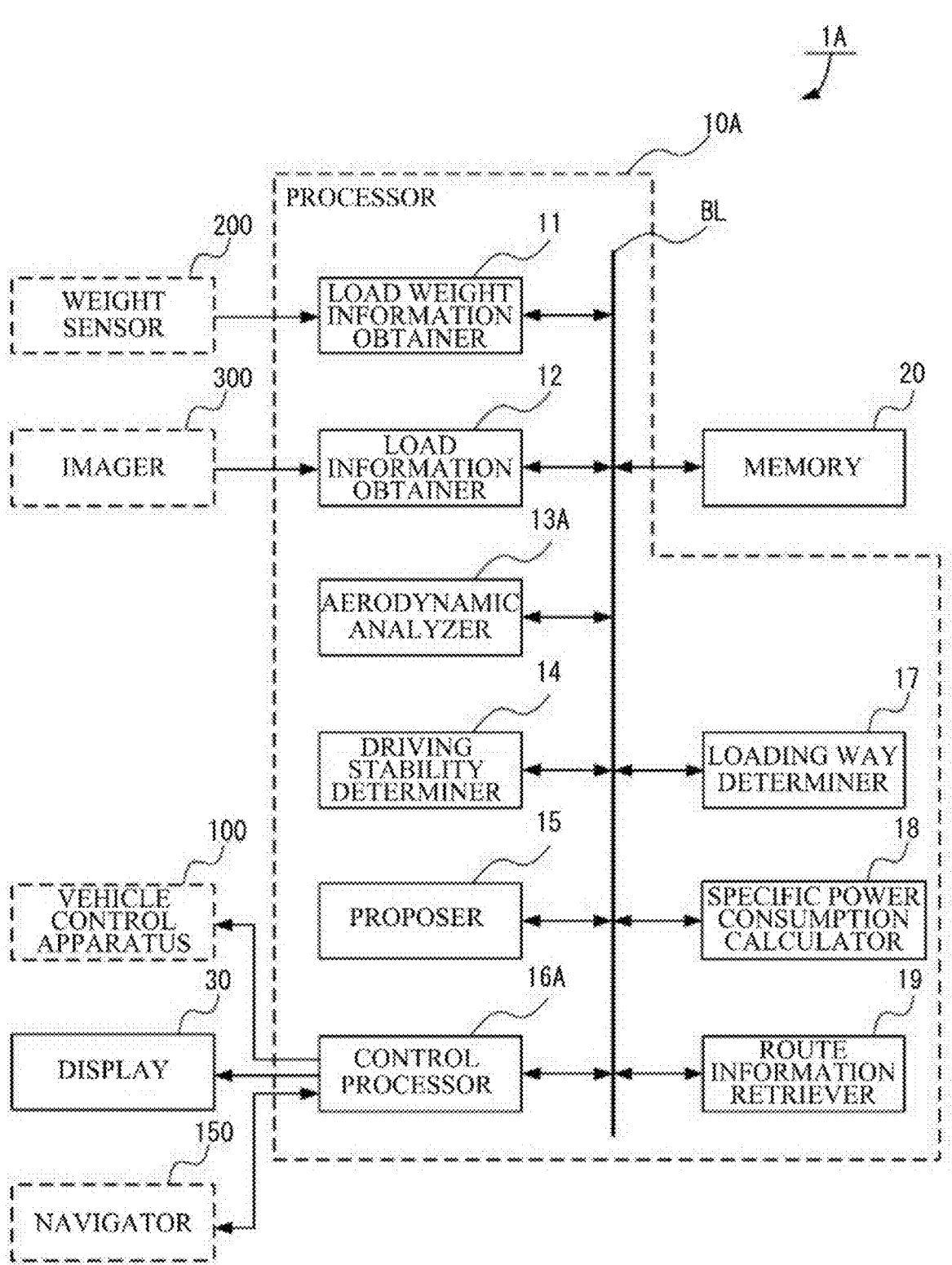
FIG. 8 is a block diagram illustrating a configuration of a processor in the in-vehicle apparatus illustrated in FIG. 7.

As illustrated in FIG. 8, the processor 10A may include the load weight information obtainer 11, the load information obtainer 12, an aerodynamic analyzer 13A, the driving stability determiner 14, the proposer 15, a control processor 16A, a loading way determiner 17, a specific power consumption calculator 18, and a route information retriever 19.

These components of the processor 10A and the memory 20 may transmit and receive various kinds of data therebetween via the bus line BL.

The aerodynamic analyzer 13A may execute the aerodynamic analysis based on the load information acquired by the load information obtainer 12.

In the second example embodiment, the aerodynamic analyzer 13A may determine the level of increase in aerodynamic drag and the level of deterioration in specific power consumption, for example.

The method of determining the level of increase in aerodynamic drag may be the same as that in the first example embodiment, and a description thereof is thus omitted herein.

An example of the method of determining the level of deterioration in specific power consumption will now be described.

In the second example embodiment, the aerodynamic analyzer 13A may determine the level of deterioration in specific power consumption based on the calculated frontal projected area Sz and the calculated side projected area Ss, for example.

The aerodynamic analyzer 13A may determine the level of the deterioration in specific power consumption based on preset information illustrated in FIGS. 9A and 9B, for example.

The preset information may include a correlation between the frontal projected area Sz and the level of the deterioration in specific power consumption.

The preset information may include a correlation between the side projected area Ss and an adjustment value for the level of deterioration in specific power consumption.

The aerodynamic analyzer 13A may determine the level of deterioration in specific power consumption based on the frontal projected area Sz and adjust the determined level of deterioration in specific power consumption based on the side projected area Ss.

When the side projected area Ss is smaller than a predetermined area, the aerodynamic analyzer 13A may refrain from adjusting the level of deterioration in specific power consumption determined based on the frontal projected area Sz.

When the side projected area Ss is larger than or equal to a predetermined area, the aerodynamic analyzer 13A may adjust the level of deterioration in specific power consumption determined based on the frontal projected area Sz by increasing the determined level by one level.

When the frontal projected area Sz is smaller than J (m$^2$) and the side projected area Ss is smaller than N (m$^2$), for example, the aerodynamic analyzer 13A may determine the level of deterioration in specific power consumption to be Level 1.

When the frontal projected area Sz is smaller than J (m$^2$) and the side projected area Ss is larger than or equal to N (m$^2$), for example, the aerodynamic analyzer 13 may determine the level of deterioration in specific power consumption to be Level 2.

The aerodynamic analyzer 13A may transmit the level of deterioration in specific power consumption to the control processor 16A, which will be described later, via the bus line BL.

The loading way determiner 17 may determine whether the loading way has been in accordance with the proposal given by the proposer 15.

In the second example embodiment, the loading way determiner 17 may determine whether the loading way has been improved based on the load information acquired by the load information obtainer 12 and the loading way proposed by the proposer 15, for example.

The loading way determiner 17 may determine whether a loading position of the load proposed by the proposer 15 matches with an actual loading position of the load, for example.

The loading way determiner 17 may determine whether the load weight of the load is less than X (kg), for example.

The loading way determiner 17 may transmit a result of the determination to the control processor 16A via the bus line BL.

The specific power consumption calculator 18 may calculate the specific power consumption based on the load weight acquired by the load weight information obtainer 11 and the result of the analysis by the aerodynamic analyzer 13A.

An example of the method of calculating the specific power consumption will now be described.

The specific power consumption calculator 18 may acquire preset information illustrated in FIGS. 10A and 10B, for example, from the memory 20 to calculate the specific power consumption.

The preset information may include, for example, the result of the analysis by the aerodynamic analyzer 13A (i.e., the level of deterioration in specific power consumption), data indicating the correlation with the rate of deterioration in specific power consumption (e.g., $\alpha_1$ to $\alpha_5$), data on a reference specific power consumption (X km/kwh) of the vehicle, and data on the rate of deterioration in specific power consumption per load weight (Y %/kg).

The reference specific power consumption may be a specific power consumption measured in a worldwide harmonized light duty driving test cycle (WLTC) mode, for example.

The specific power consumption calculator 18 may determine the rate of deterioration in specific power consumption due to the increase in aerodynamic drag to be any one of $\alpha 1$ to $\alpha 5$, based on the result of the analysis by the aerodynamic analyzer 13A (i.e., the level of deterioration in specific power consumption) and the acquired preset information, for example.

The specific power consumption calculator 18 may calculate a rate of deterioration in specific power consumption R due to the load weight, based on the rate of deterioration in specific power consumption per load weight (Y %/kg) and the load weight of the load acquired by the load weight information obtainer 11, for example.

The specific power consumption calculator 18 may determine the total value of the rate of deterioration in specific power consumption ($\alpha 1$ to $\alpha 5$) due to the increase in aerodynamic drag and the rate of deterioration in specific power consumption p due to the load weight to be a rate of deterioration in specific power consumption y, for example.

The specific power consumption calculator 18 may calculate the specific power consumption of the vehicle based on the reference specific power consumption acquired from the preset information and the rate of deterioration in specific power consumption y, for example.

The specific power consumption calculator 18 may transmit a result of the determination to the control processor 16A, which will be described later, via the bus line BL.

The route information retriever 19 retrieves route information including the charging timing in the travel from the departure point to the destination, based on a current amount of charge and a result of the calculation by the specific power consumption calculator 18.

For example, the route information retriever 19 may calculate a cruising range based on data on a current residual amount of charge received from the control processor 16A to be described later, and the specific power consumption calculated by the specific power consumption calculator 18, for example.

The route information retriever 19 may retrieve a traveling route from the departure point to the destination via a power charging facility located within the cruising range, based on the calculated cruising range, the map information and the information on the locations of the power charging facilities acquired from the memory 20, and the information on the departure point and the destination received from the control processor 16A to be described later, for example.

When retrieving the traveling route, the route information retriever 19 may refer to the map information acquired from the memory 20 and the load information acquired from the control processor 16A to be described later, and retrieve a safe traveling route that avoids the occurrence of contact between the load and a planimetric feature such as a tunnel, an electric wire, or a roadside tree, for example.

The route information retriever 19 may transmit the retrieved route information to the control processor 16A, which will be described later, via the bus line BL.

The control processor 16A may control an overall operation of the in-vehicle apparatus 1A in accordance with the control program stored in the memory 20.

In the second example embodiment, the control processor 16A may send the instruction to acquire the load weight of the load to the load weight information obtainer 11 via the bus line BL, for example.

In the second example embodiment, the control processor 16A may send the instruction to acquire the load information to the load information obtainer 12 via the bus line BL, for example.

In the second example embodiment, the control processor 16A may transmit the load information received from the load information obtainer 12 to the aerodynamic analyzer 13A via the bus line BL, for example, to cause the aerodynamic analyzer 13A to execute the aerodynamic analysis.

In the second example embodiment, the control processor 16A may transmit the load weight of the load received from the load weight information obtainer 11 and the result of the analysis by the aerodynamic analyzer 13A to the driving stability determiner 14 via the bus line BL, for example, to cause the driving stability determiner 14 to calculate the driving stability in the travel of the vehicle.

In the second example embodiment, when receiving, from the driving stability determiner 14, the result of the determination indicating that the driving stability is not to be sufficiently secured in the travel of the vehicle, for example, the control processor 16A performs the control adapted to prohibit the vehicle from traveling.

When receiving, from the driving stability determiner 14, the result of the determination indicating that the driving stability is not to be sufficiently secured in the travel of the vehicle, for example, the control processor 16A may send the instruction to prohibit the vehicle from traveling to the vehicle control apparatus 100.

In the second example embodiment, when receiving, from the driving stability determiner 14, the result of the determination indicating that the driving stability is not to be sufficiently secured in the travel of the vehicle, for example, the control processor 16A may transmit the load weight and the load information to the proposer 15 via the bus line BL to cause the proposer 15 to propose the appropriate loading way.

In the second example embodiment, when receiving, from the driving stability determiner 14, the result of the determination indicating that the driving stability is to be sufficiently secured in the travel of the vehicle, for example, the control processor 16A may transmit the load weight and the result of the analysis by the aerodynamic analyzer 13A to the specific power consumption calculator 18 via the bus line BL to cause the specific power consumption calculator 18 to calculate the specific power consumption.

In the second example embodiment, the control processor 16A may send an instruction to acquire the load information again to the load information obtainer 12 after causing the display 30 to display the loading way proposed by the proposer 15, for example.

In the second example embodiment, the control processor 16A may transmit the load information acquired again and the information on the loading way received from the proposer 15 to the loading way determiner 17 to cause the loading way determiner 17 to determine whether the loading way has been improved, for example.

In the second example embodiment, when receiving the result of the determination indicating that the loading way has been improved from the loading way determiner 17, for example, the control processor 16A may send the instruction to acquire the load weight of the load again to the load weight information obtainer 11 via the bus line BL.

In the second example embodiment, when receiving the result of the determination indicating that the loading way has been improved from the loading way determiner 17, for example, the control processor 16A may transmit the load information acquired again to the aerodynamic analyzer 13 via the bus line BL to cause the aerodynamic analyzer 13 to execute the aerodynamic analysis again.

In the second example embodiment, when receiving the result of the determination indicating that the loading way has been improved from the loading way determiner 17, for example, the control processor 16A may transmit the load weight acquired again and the result of the analysis by the aerodynamic analyzer 13A to the specific power consumption calculator 18 via the bus line BL to cause the specific power consumption calculator 18 to calculate the specific power consumption.

In the second example embodiment, the control processor 16A may acquire the information on the departure point and the destination from the navigator 150, for example.

In the second example embodiment, the control processor 16A may acquire a current residual amount of charge of a non-illustrated power charging control processor for an accumulator battery, for example.

In the second example embodiment, the control processor 16A may transmit the current residual amount of charge of the accumulator battery, the load information, the information on the departure point and the destination, and the result of the calculation by the specific power consumption calculator 18 to the route information retriever 19 via the bus line BL, for example, to cause the route information retriever 19 to retrieve the route information.

In the second example embodiment, the control processor 16A may transmit the route information received from the route information retriever 19 to the navigator 150, for example.

When receiving the route information from the control processor 16A, the navigator 150 may display the received route information and start the route guidance from the departure point to the destination.

<Route Information Retrieving Process by In-Vehicle Apparatus 1A>

Figure 11:
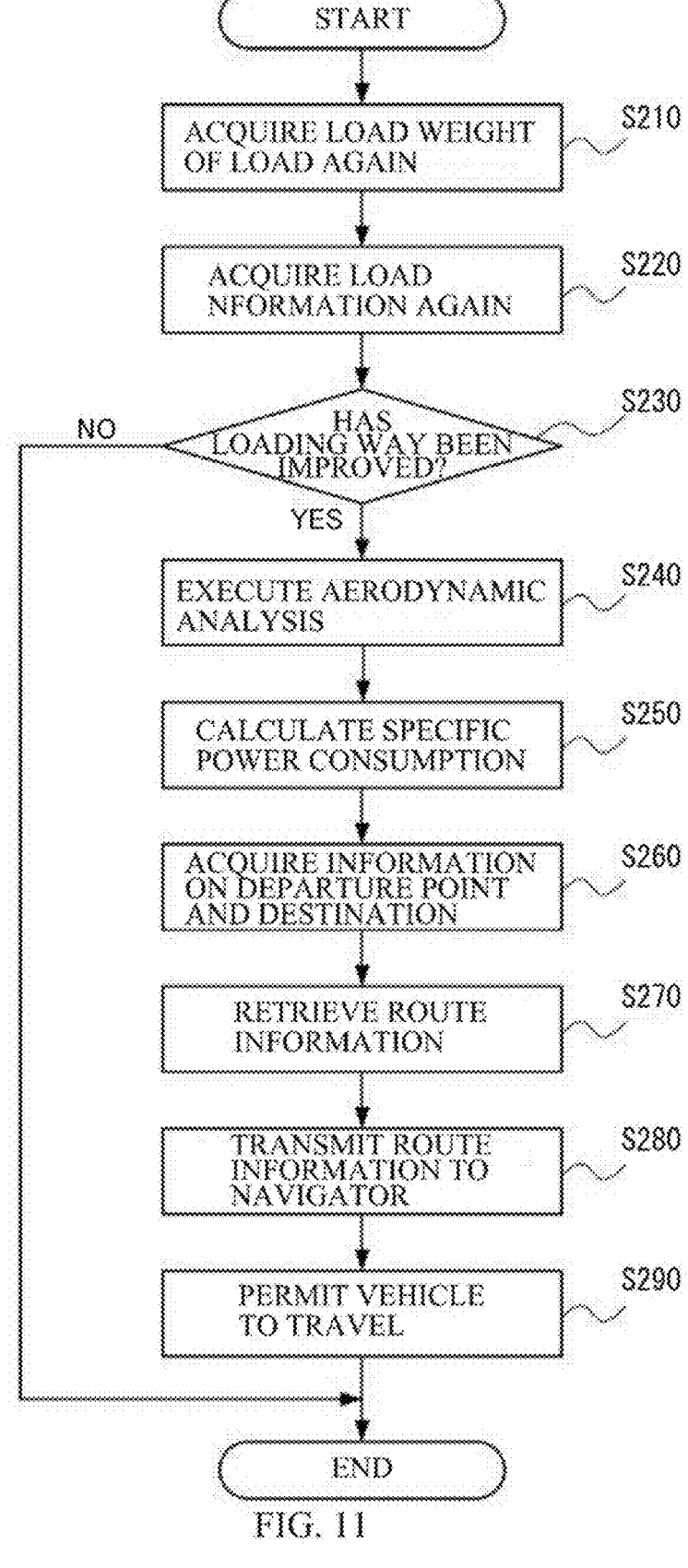
FIG. 11 is a flowchart of a route information retrieving process to be performed by the in-vehicle apparatus illustrated in FIG. 7.

A process adapted to retrieve the route information to be performed by the in-vehicle apparatus 1A according to the second example embodiment will now be described with reference to FIG. 11.

Described below is the process adapted to retrieve the route information to be executed after the in-vehicle apparatus 1A causes the display 30 to display the appropriate loading way.

The control processor 16A may send the instruction to acquire the load weight again to the load weight information obtainer 11 to cause the load weight information obtainer 11 to acquire the load weight again (Step S210).

The control processor 16A may send the instruction to acquire the load information on the load again to the load information obtainer 12 (Step S220).

The control processor 16A may transmit the load weight acquired in Step S210, the load information acquired in Step S220, and the information on the loading way proposed by the proposer 15 to the loading way determiner 17 to determine whether the loading way has been improved (Step S230).

When determining that the loading way has not been improved (Step S230: NO), the control processor 16A may end the process.

When determining that the loading way has been improved (Step S230: YES), the control processor 16A may cause the process to proceed to Step S240.

The control processor 16A may transmit the load information acquired in Step S210 to the aerodynamic analyzer 13A to cause the aerodynamic analyzer 13A to execute the aerodynamic analysis (Step S240).

The control processor 16A may transmit the load weight acquired in Step S230 and the result of the aerodynamic analysis acquired in Step S240 (i.e., the level of deterioration in specific power consumption) to the specific power consumption calculator 18 to cause the specific power consumption calculator 18 to calculate the specific power consumption (Step S250).

The control processor 16A may acquire the information on the departure point and the destination from the navigator 150 (Step S260).

The control processor 16A may transmit the specific power consumption acquired in Step S250 and the information on the departure point and the destination acquired in Step S260 to the route information retriever 19 to cause the route information retriever 19 to retrieve the route information (Step S270).

The control processor 16A may transmit the route information retrieved in Step S270 to the navigator 150 (Step S280).

The control processor 16A may send an instruction to permit the vehicle to travel to the vehicle control apparatus 100 (Step S290), and end the process.

Workings and Effects

As described above, the in-vehicle apparatus 1A according to the second example embodiment may include the loading way determiner 17, the specific power consumption calculator 18, and the route information retriever 19. The loading way determiner 17 may determine whether the loading way has been improved in accordance with the proposal given by the proposer 15. When the loading way determiner 17 determines that the loading way has been improved, the specific power consumption calculator 18 may calculate the specific power consumption based on the load weight and the result of the analysis by the aerodynamic analyzer 13A. The route information retriever 19 may retrieve the route information including the charging timing in the travel from the departure point to the destination, based on the current amount of charge and the result of the calculation by the specific power consumption calculator 18.

That is, when it is determined that the loading way has been improved, the in-vehicle apparatus 1A may calculate the specific power consumption based on the load weight of the load placed on the roof rail or roof carrier of the vehicle and the size and shape of the load, and retrieve the route information including the charging timing in the travel from the departure point and the destination based on the calculated specific power consumption.

Accordingly, the in-vehicle apparatus 1A may calculate the specific power consumption taking into consideration the deterioration in specific power consumption due to the load placed on the vehicle. It is therefore possible for the in-vehicle apparatus 1A to present the user with the route information including an accurate charging timing in the travel from the departure point to the destination.

Being given with the route information including the accurate charging timing, the user makes it possible to enjoy stress-free safety driving to the destination.

In the second example embodiment, the in-vehicle apparatus 1A may retrieve the traveling route that avoids the contact between the load and a planimetric feature such as a tunnel, an electric wire, or a roadside tree, referring to the map information and the load information.

Since the contact between the load and the planimetric feature is avoidable, the user makes it possible to enjoy safety driving to the destination.

In the second example embodiment, when receiving the result of the determination indicating that the loading way has been improved in accordance with the proposal given by the proposer 15, the in-vehicle apparatus 1A may send the instruction to permit the vehicle to travel to the vehicle control apparatus 100.

That is, when not receiving the result of the determination indicating that the loading way has been improved, the in-vehicle apparatus 1A may refrain from permitting the vehicle to travel.

Accordingly, the in-vehicle apparatus 1A prohibits the vehicle from traveling when the driving stability is not to be sufficiently secured. It is therefore possible for the in-vehicle apparatus 1A to avoid the occurrence of a collapse or a fall of the load and the occurrence of a rollover accident of the vehicle, for example.

Third Example Embodiment

An in-vehicle apparatus 1B according to a third example embodiment will now be described with reference to FIGS. 12 to 15.

Note that elements denoted with the same reference numerals as those in the first and second example embodiments have the same functions as those in the first and second example embodiments, and a detailed description thereof is thus omitted herein.

<Configuration of In-Vehicle Apparatus 1B>

Figure 12:
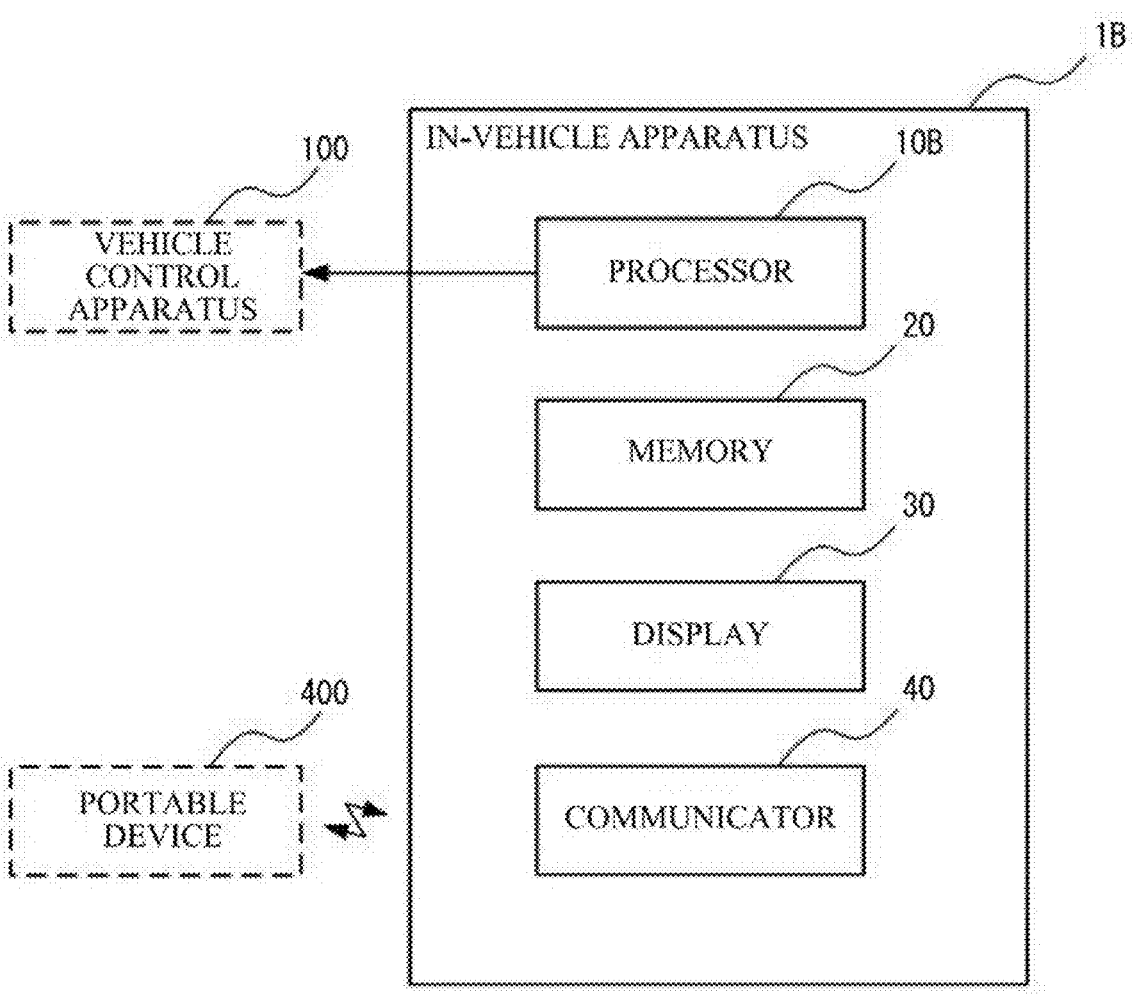
FIG. 12 is a block diagram illustrating a configuration of an in-vehicle apparatus according to one example embodiment of the disclosure.

As illustrated in FIG. 12, the in-vehicle apparatus 1B may include a processor 10B, the memory 20, the display 30, and a communicator 40.

In the third example embodiment, the processor 10B may send a message requesting to provide a load image to a portable device 400 via the communicator 40 to be described later, for example.

In the third example embodiment, the processor 10B may acquire the load image captured by the portable device 400 via the communicator 40 to be described later, for example.

In the third example embodiment, the processor 10B may determine the driving stability of the vehicle based on the load image captured by the portable device 400, for example.

In the third example embodiment, when determining that the driving stability is not to be sufficiently secured in the travel of the vehicle, the processor 10B may cause the vehicle control apparatus 100 to execute the control adapted to prohibit the vehicle from traveling, for example.

In the third example embodiment, when determining that the driving stability is not to be sufficiently secured in the travel of the vehicle, the processor 10B may send the instruction to prohibit the vehicle from traveling to the vehicle control apparatus 100, for example.

In the third example embodiment, when determining that the driving stability is not to be sufficiently secured in the travel of the vehicle, the processor 10B may propose an appropriate loading way, for example.

In the third example embodiment, when determining that the driving stability is not to be sufficiently secured in the travel of the vehicle, the processor 10B may cause the display 30 to display an error message and the information on the appropriate loading way, for example.

A configuration of the processor 10B will be described later.

The communicator 40 may communicate with the portable device 400 owned by the user under the control by the processor 10B.

Non-limiting examples of the portable device 400 may include a smartphone and a tablet.

The communicator 40 may be, for example, a communication device using near-field wireless communication such as the Bluetooth (registered trademark). The communicator 40 may be communicably coupled to the portable device 400 to transmit and receive data therebetween.

The communicator 40 may transmit and receive data under the control by the processor 10B.

In the third example embodiment, the communicator 40 may send a message requesting to provide the load image to the portable device 400.

In the third example embodiment, the communicator 40 may receive the load image on the load captured by the portable device 400.

<Configuration of Processor 10B>

Figure 13:
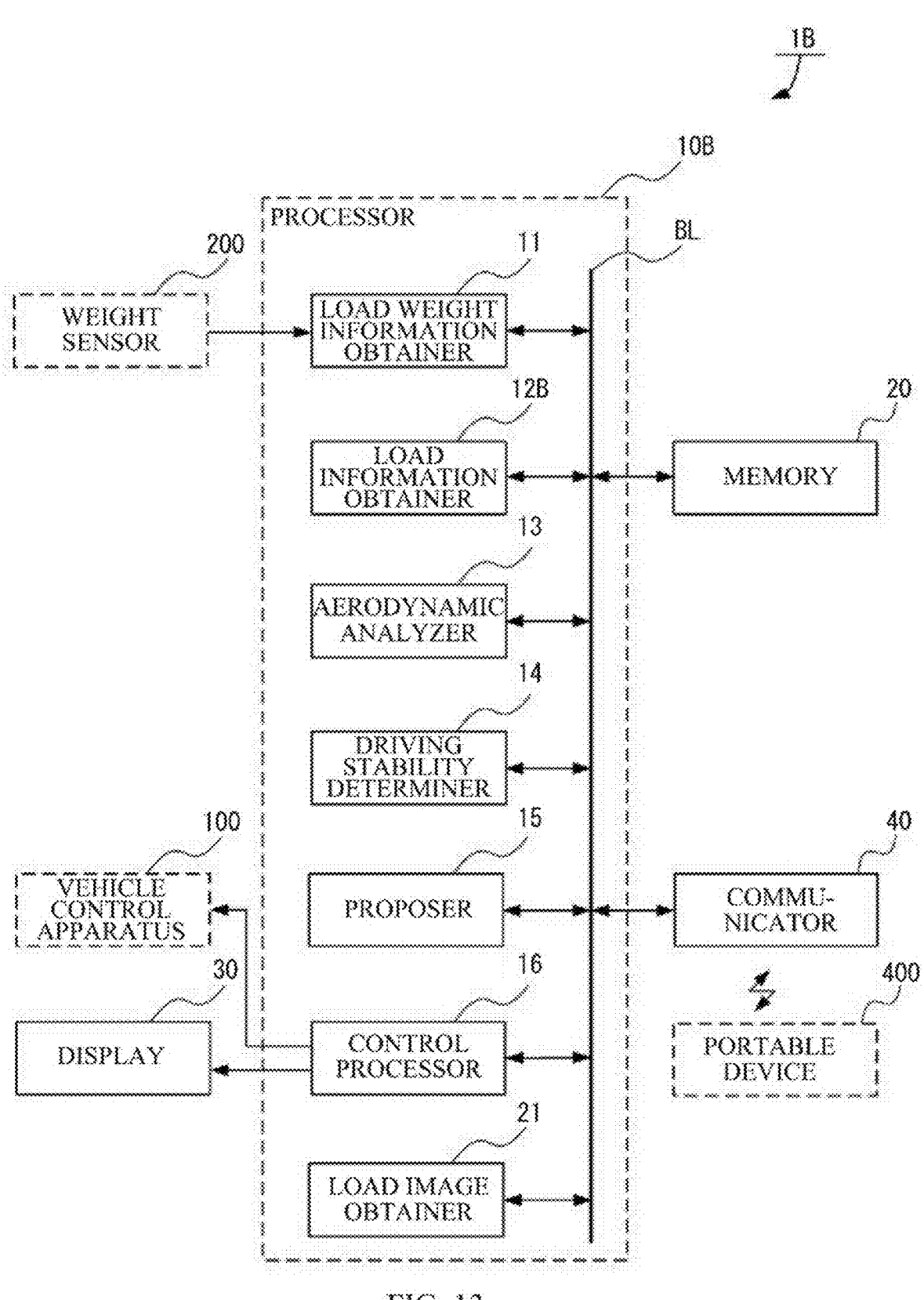
FIG. 13 is a block diagram illustrating a configuration of a processor in the in-vehicle apparatus illustrated in FIG. 12.

As illustrated in FIG. 13, the processor 10B may include the load weight information obtainer 11, the load information obtainer 12B, the aerodynamic analyzer 13, the driving stability determiner 14, the proposer 15, a control processor 16B, and a load image obtainer 21.

These components of the processor 10B and the memory 20 may transmit and receive various kinds of data therebetween via the bus line BL.

In the third example embodiment, the load information obtainer 12B may acquire the load information including the size and shape of the load from the load image acquired by the load image obtainer 21, for example.

The load information obtainer 12B may transmit the acquired load information to the control processor 16B, which will be described later, via the bus line BL.

The load image obtainer 21 may acquire the load image captured by the portable device 400.

In the third example embodiment, the load image obtainer 21 may acquire the load image of the load captured by the portable device 400 via the communicator 40, for example.

The load image obtainer 21 may transmit the acquired load image to the control processor 16B, which will be described later, via the bus line BL.

The control processor 16B may control an overall operation of the in-vehicle apparatus 1B in accordance with the control program stored in the memory 20.

In the third example embodiment, the control processor 16B may send the instruction to acquire the load image from the portable device 400 to the load image obtainer 21 via the bus line BL, for example.

When sending the instruction to acquire the load image from the portable device 400 to the load image obtainer 21, the control processor 16B may send the message requesting to provide the load image to the portable device 400 via the communicator 40.

For example, the control processor 16B may send a message indicating "The driving stability of the vehicle can be largely deteriorated due to an influence of the load. Capture images of the entire load on the vehicle from front, rear, right, and left directions of the vehicle to determine the driving stability of the vehicle."

In the third example embodiment, the control processor 16B may transmit the load image received from the load image obtainer 21 to the load information obtainer 12B via the bus line BL, for example, to cause the load information obtainer 12B to acquire the load information.

In the third example embodiment, the control processor 16B may transmit the load information received from the load information obtainer 12B to the aerodynamic analyzer 13 via the bus line BL, for example, to cause the aerodynamic analyzer 13 to execute the aerodynamic analysis.

In the third example embodiment, the control processor 16B may transmit the load weight of the load received from the load weight information obtainer 11 and the result of the analysis by the aerodynamic analyzer 13 to the driving stability determiner 14 via the bus line BL, for example, to cause the driving stability determiner 14 to determine the driving stability in the travel of the vehicle.

In the third example embodiment, when receiving, from the driving stability determiner 14, the result of the determination indicating that the driving stability is not to be sufficiently secured in the travel of the vehicle, for example, the control processor 16B may perform the control adapted to prohibit the vehicle from traveling.

When receiving, from the driving stability determiner 14, the result of the determination indicating that the driving stability is not to be sufficiently secured in the travel of the vehicle, for example, the control processor 16B may send the instruction to prohibit the vehicle from traveling to the vehicle control apparatus 100.

In the third example embodiment, when receiving, from the driving stability determiner 14, the result of the determination indicating that the driving stability is not to be sufficiently secured in the travel of the vehicle, for example, the control processor 16B may transmit the load weight and the load information to the proposer 15 via the bus line BL to cause the proposer 15 to propose the appropriate loading way.

<Loading Way Proposal Process by In-Vehicle Apparatus 1B>

A process adapted to propose the loading way to be performed by the in-vehicle apparatus 1B according to the third example embodiment will now be described with reference to FIGS. 14 and 15.

Figure 14:
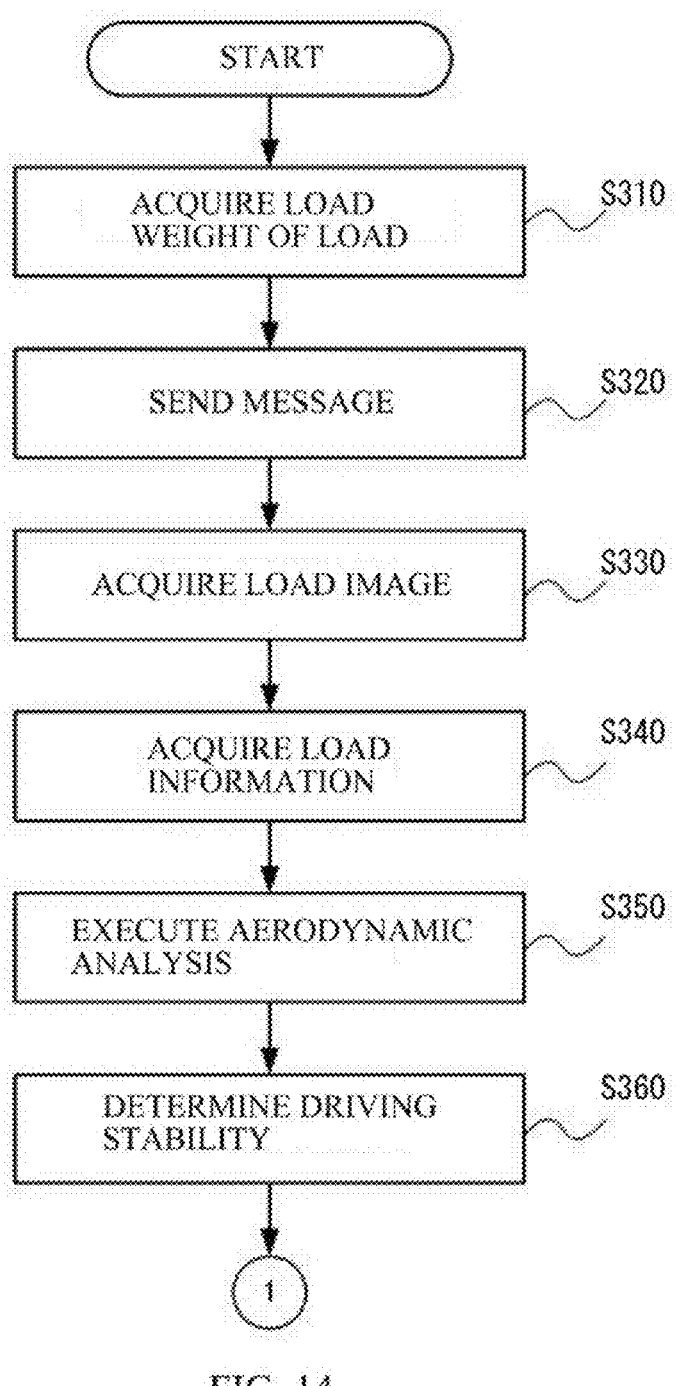
FIG. 14 is a flowchart of a process to be performed by the in-vehicle apparatus illustrated in FIG. 12.

As illustrated in FIG. 14, the control processor 16B may send the instruction to acquire the load weight of the load to the load weight information obtainer 11 to cause the load weight information obtainer 11 to acquire the load weight of the load (Step S310).

The control processor 16B may send the message requesting to provide the load image to the portable device 400 via the communicator 40 (Step S320).

The control processor 16B may send the instruction to acquire the load image to the load image obtainer 21 to cause the load image obtainer 21 to acquire the load image from the portable device 400 (Step S330).

The control processor 16B may transmit the load image acquired in Step S330 to the load information obtainer 12B to cause the load information obtainer 12B to acquire the load information (Step S340).

The control processor 16B may transmit the load information acquired in Step S340 to the aerodynamic analyzer 13 to cause the aerodynamic analyzer 13 to execute the aerodynamic analysis (Step S350).

The control processor 16B may transmit the load weight acquired in Step S310 and the result of the aerodynamic analysis acquired in Step S350 to the driving stability determiner 14 to cause the driving stability determiner 14 to determine the driving stability (Step S360).

Figure 15:
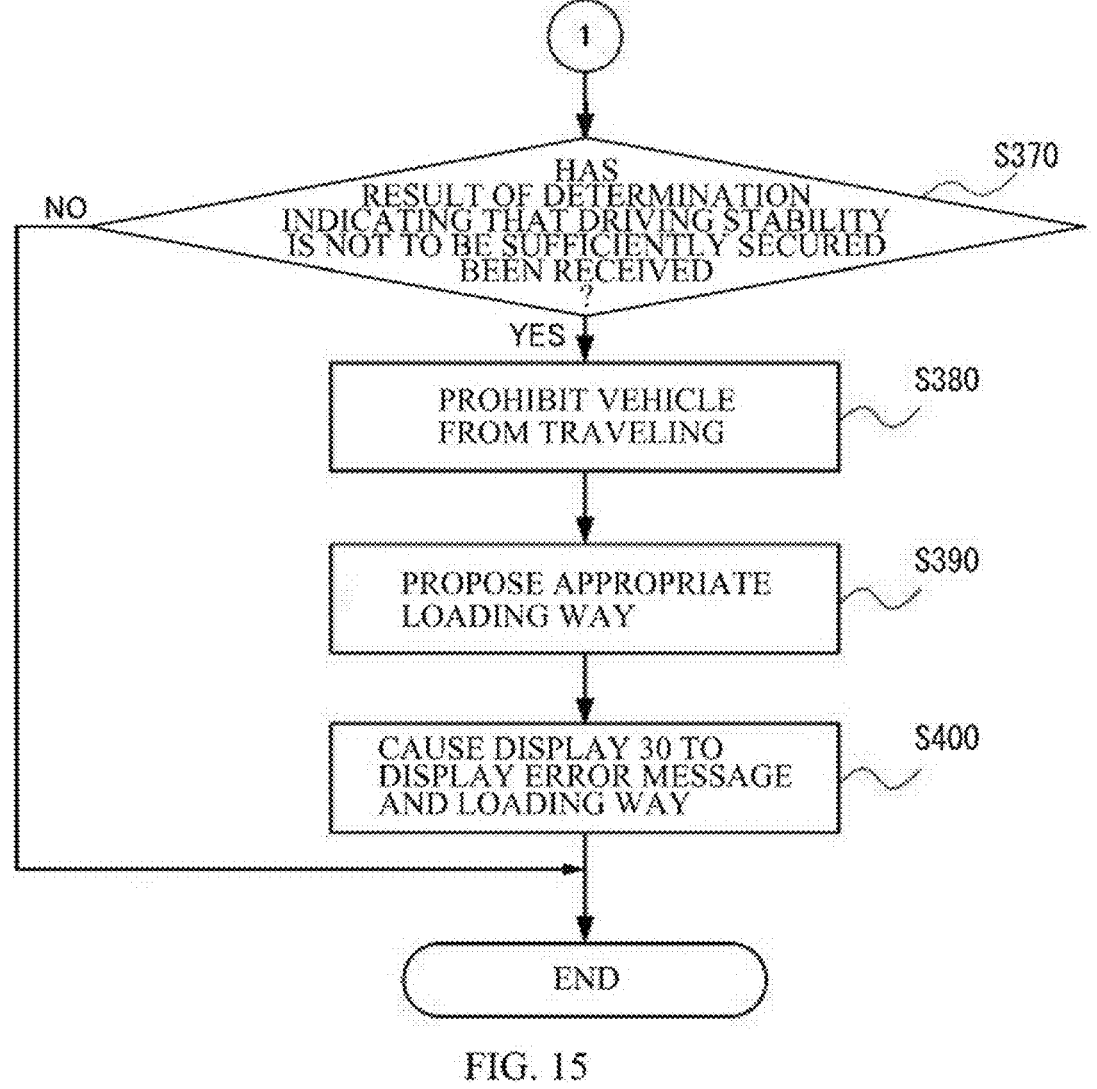
FIG. 15 is a flowchart of the process to be performed by the in-vehicle apparatus illustrated in FIG. 12.

As illustrated in FIG. 15, the control processor 16B may determine whether the result of the determination indicating that the driving stability is not to be sufficiently secured in the travel of the vehicle has been received from the driving stability determiner 14 (Step S370).

When determining that the result of the determination indicating that the driving stability is not to be sufficiently secured in the travel of the vehicle has not been received from the driving stability determiner 14 (Step S370: NO), the control processor 16B may end the process.

When determining that the result of the determination indicating that the driving stability is not be sufficiently secured in the travel of the vehicle has been received from the driving stability determiner 14 (Step S370: YES), the control processor 16B may cause the process to proceed to Step S380.

The control processor 16B may send the instruction to prohibit the vehicle from traveling to the vehicle control apparatus 100 (Step S380).

The control processor 16B may transmit the load weight acquired in Step S310 and the load information acquired in Step S340 to the proposer 15 to cause the proposer 15 to propose the appropriate loading way (Step S390).

The control processor 16B may cause the display 30 to display an error message and the information on the appropriate loading way received from the proposer 15 (Step S400), and end the process.

Workings and Effects

As described above, the in-vehicle apparatus 1B according to the third example example embodiment may include the load image obtainer 21 that incorporates the load image captured by the portable device 400.

The load information obtainer 12B may acquire the size and shape of the load from the load image acquired by the load image obtainer 21.

The in-vehicle apparatus 1B may determine the driving stability based on the image data of the load captured by the portable device 400 owned by the user.

The portable device 400 may be configured to capture the load image at an angle and in a scale that are freely selected.

When the load placed on the vehicle is a long lumber such as a boat, for example, it is difficult for an imager disposed in the vehicle to capture an image of the entire load; therefore, the portable device 400 owned by the user may be used to acquire the load image.

This enables the in-vehicle apparatus 1B to acquire the size and shape of the load based on the load image covering the entire load. It is therefore possible to accurately determine the driving stability.

The in-vehicle apparatus 1B according to the third example embodiment may include the communicator 40 that communicates with the portable device 400.

The communicator 40 may send the message requesting to provide the load image to the portable device 400 under the control by the control processor 16B.

For example, the control processor 16B may send a message indicating "The driving stability of the vehicle can be largely deteriorated due to an influence of the load. Capture images of the entire load on the vehicle from front, rear, right, left, and upper directions of the vehicle to determine the driving stability of the vehicle."

In this way, the in-vehicle apparatus 1B makes it possible to enable the user to recognize the possibility of deterioration in driving stability of the vehicle due to the loading way.

Fourth Example Embodiment

An in-vehicle apparatus 1C according to a fourth example embodiment will now be described with reference to FIGS. 16 to 20.

Note that elements denoted with the same reference numerals as those in the first to third example embodiments have the same functions as those in the first to third example embodiments, and detailed description thereof is thus omitted herein.

<Configuration of In-Vehicle Apparatus 1C>

Figure 16:
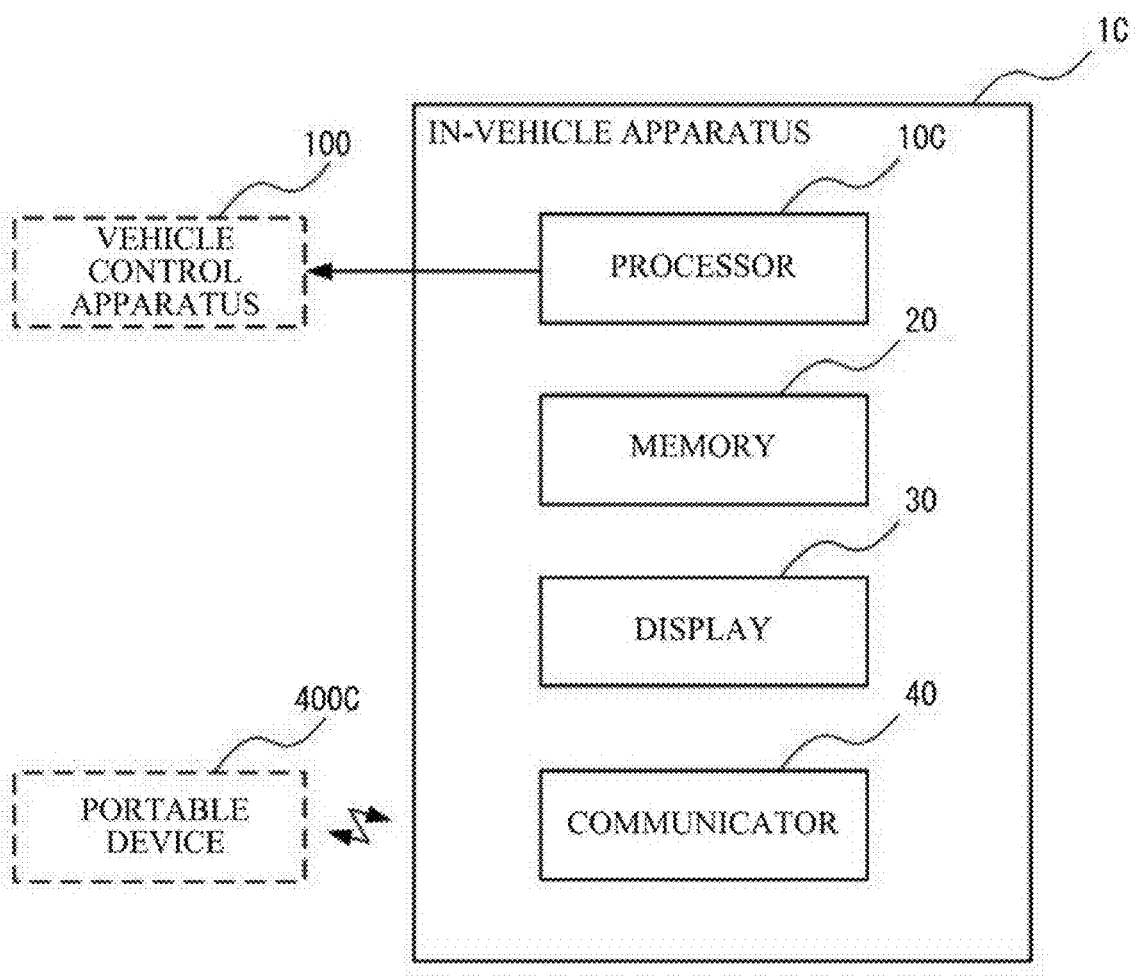
FIG. 16 is a block diagram illustrating a configuration of an in-vehicle apparatus according to one example embodiment of the disclosure.

As illustrated in FIG. 16, the in-vehicle apparatus 1C according to the fourth example embodiment may include a processor 10C, the memory 20, the display 30, and the communicator 40.

In the fourth example embodiment, the processor 10C may acquire the load image captured by a portable device 400C via the communicator 40, for example.

In the fourth example embodiment, the processor 10C may determine the driving stability of the vehicle based on the load image captured by the portable device 400C, for example.

In the fourth example embodiment, when determining that the driving stability is not to be sufficiently secured in the travel of the vehicle, for example, the processor 10C may cause the vehicle control apparatus 100 to execute the control adapted to prohibit the vehicle from traveling.

When determining that the driving stability is not to be sufficiently secured in the travel of the vehicle, for example, the processor 10C may send the instruction to prohibit the vehicle from traveling to the vehicle control apparatus 100.

In the fourth example embodiment, when determining that the driving stability is not to be sufficiently secured in the travel of the vehicle, for example, the processor 10C may propose an appropriate loading way.

In the fourth example embodiment, when determining that the driving stability is not to be sufficiently secured in the travel of the vehicle, for example, the processor 10C may cause the display 30 to display an error message and the information on the appropriate loading way.

A configuration of the processor 10C will be described later.

The portable device 400C may be a smartphone owned by the user, for example, and may execute an application program downloaded in the smartphone.

In the fourth example embodiment, the portable device 400C may capture a load image and transmit the load image in accordance with the application program.

For example, the user may download an application program adapted to capture a load image and transmit the load image from the server coupled to the Internet in advance, and store the application program in the portable device 400C.

In the fourth example embodiment, the portable device 400C may transmit the captured load image to the in-vehicle apparatus 1C, for example.

A configuration of the portable device 400C will be described later.

<Configuration of Processor 10C>

Figure 17:
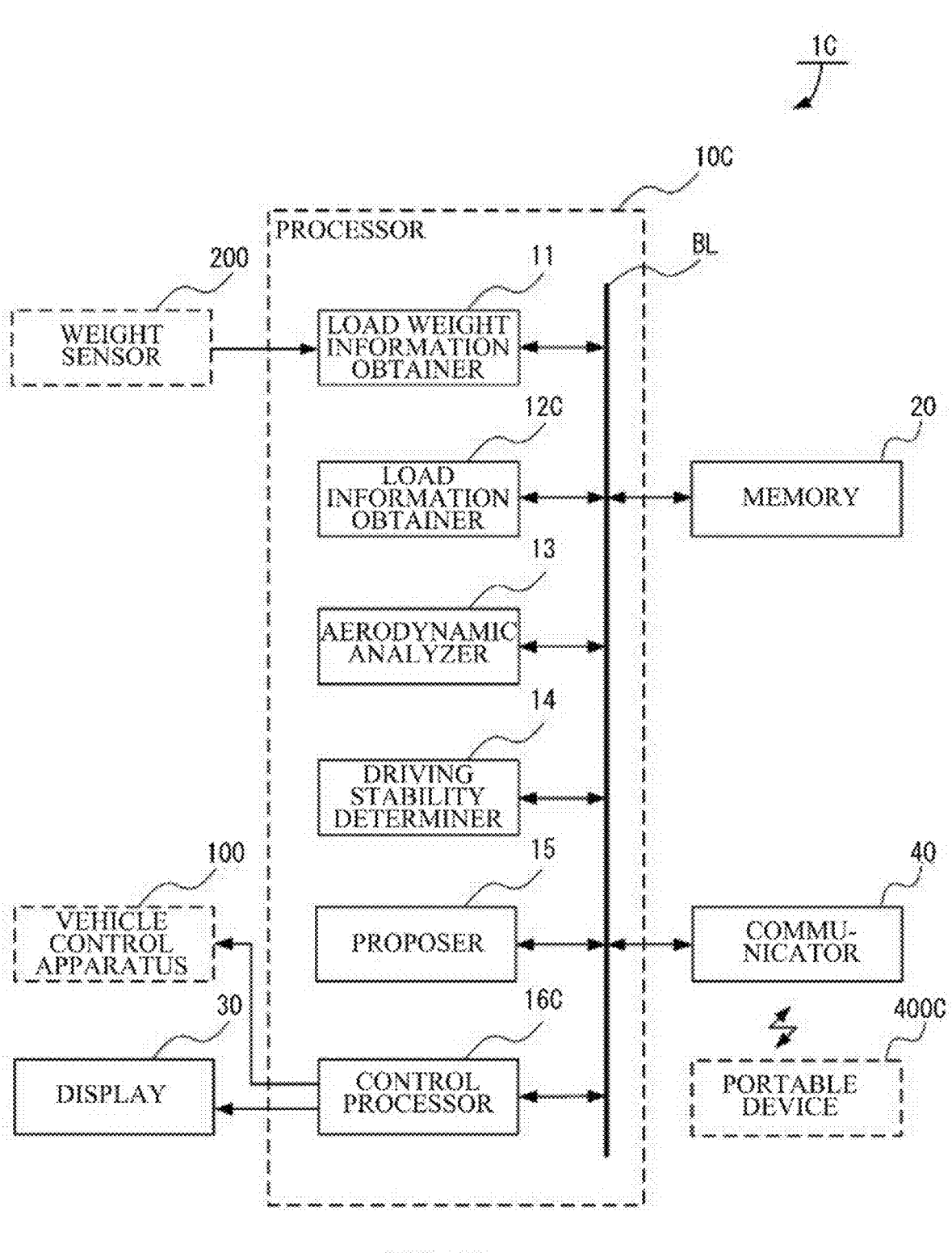
FIG. 17 is a block diagram illustrating a configuration of a processor in the in-vehicle apparatus illustrated in FIG. 16.

As illustrated in FIG. 17, the processor 10C may include the load weight information obtainer 11, a load information obtainer 12C, the aerodynamic analyzer 13, the driving stability determiner 14, the proposer 15, and a control processor 16C.

These components of the processor 10C and the memory 20 may transmit and receive various kinds of data therebetween via a bus line BL.

In the fourth example embodiment, the load information obtainer 12C may acquire the load information on the size and shape of the load from the load image of the load captured by the portable device 400C, for example.

The load information obtainer 12C may acquire the load information on the size and shape of the load from the load image received from the control processor 16C to be described later.

The load information obtainer 12C may transmit the acquired load information to the control processor 16C, which will be described later, via the bus line BL.

The control processor 16C may control an overall operation of the in-vehicle apparatus 1C in accordance with the control program stored in the memory 20.

In the fourth example embodiment, the control processor 16C may send the instruction to acquire the load image to the portable device 400C via the communicator 40, for example.

The control processor 16C may receive the load image from the portable device 400C via the communicator 40.

In the fourth example embodiment, the control processor 16C may transmit the load image received from the portable device 400C to the load information obtainer 12C via the bus line BL, for example, to cause the load information obtainer 12C to acquire the load information.

In the fourth example embodiment, the control processor 16C may transmit the load information received from the load information obtainer 12C to the aerodynamic analyzer 13 via the bus line BL, for example, to cause the aerodynamic analyzer 13 to execute the aerodynamic analysis.

In the fourth example embodiment, the control processor 16C may transmit the load weight of the load received from the load weight information obtainer 11 and the result of the analysis by the aerodynamic analyzer 13 to the driving stability determiner 14 via the bus line BL, for example, to cause the driving stability determiner 14 to determine the driving stability in the travel of the vehicle.

In the fourth example embodiment, when receiving, from the driving stability determiner 14, the result of the determination indicating that the driving stability is not to be sufficiently secured in the travel of the vehicle, for example, the control processor 16C performs the control adapted to prohibit the vehicle from traveling.

For example, when receiving, from the driving stability determiner 14, the result of the determination indicating that the driving stability is not to be sufficiently secured in the travel of the vehicle, the control processor 16C may send the instruction to prohibit the vehicle from traveling to the vehicle control apparatus 100.

In the fourth example embodiment, when receiving, from the driving stability determiner 14, the result of the determination indicating that the driving stability is not to be sufficiently secured in the travel of the vehicle, for example, the control processor 16C may transmit the load weight and the load information to the proposer 15 via the bus line BL to cause the proposer 15 to propose the appropriate loading way.

<Configuration of Portable Device 400C>

Figure 18:
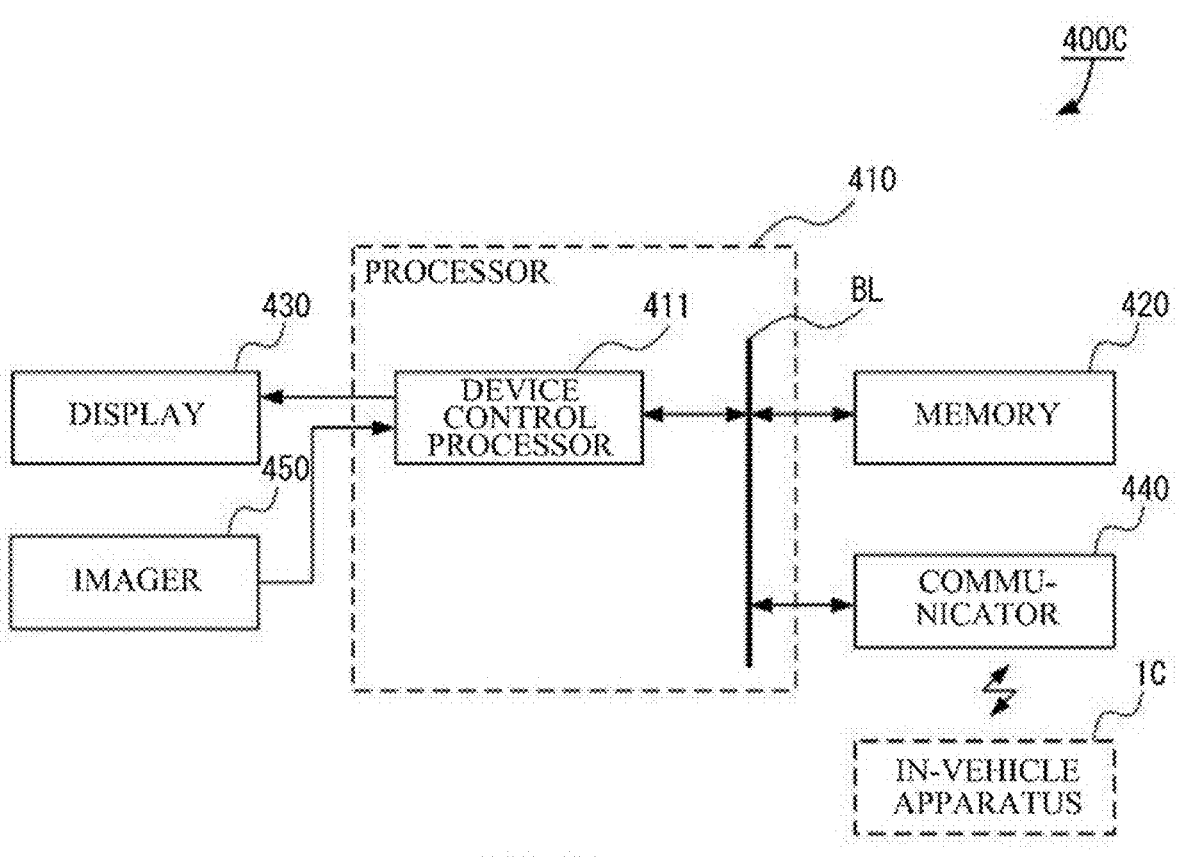
FIG. 18 is a block diagram illustrating a configuration of a portable device communicating with the in-vehicle apparatus illustrated in FIG. 16.

As illustrated in FIG. 18, the portable device 400C may include a processor 410, a memory 420, a display 430, a communicator 440, and an imager 450.

In the fourth example embodiment, when receiving the instruction to acquire a load image from the in-vehicle apparatus 1C, for example, the processor 410 may cause the imager 450 to capture the load image of the load.

In the fourth example embodiment, the processor 410 may transmit the captured load image to the in-vehicle apparatus 1C via the communicator 440, for example.

A configuration of the processor 410 will be described later.

The memory 420 may include a non-illustrated read only memory (ROM) and a non-illustrated random access memory (RAM).

In the fourth example embodiment, the memory 420 may store a control program and various kinds of data received from the processor 410.

In the fourth example embodiment, the memory 420 may store an application program adapted to capture and transmit the load image, for example.

The display 430 may be, for example, a display panel such as a liquid crystal display, and may display information received from the processor 410.

The communicator 440 may communicate with the in-vehicle apparatus 1C under the control by the processor 410.

The communicator 440 may be, for example, a communication device using near-field wireless communication such as the Bluetooth (registered trademark). The communicator 440 may be communicably coupled to the in-vehicle apparatus 1C to transmit and receive data therebetween.

The imager 450 may be, for example, a camera built in the portable device 400C. The imager 450 may include an imaging device such as a charge coupled device (CCD).

In the fourth example embodiment, the imager 450 may transmit the captured image to the processor 410, for example.

In the fourth example embodiment, the imager 450 may capture a load image of the load, for example.

The imager 450 may transmit the load image to the processor 410.

<Configuration of Processor 410>

As illustrated in FIG. 18, the processor 410 may include a device control processor 411.

The device control processor 411 and the memory 420 may transmit and receive various kinds of data therebetween via the bus line BL.

The device control processor 411 may control an overall operation of the portable device 400C in accordance with the control program stored in the memory 420, and the application program adapted to capture and transmit the load image.

In the fourth example embodiment, the device control processor 411 may cause the display 430 to display the instruction to capture the load image, the method of capturing the load image, and a sample of the load image in accordance with the application program, for example.

When receiving the instruction to acquire the load image from the in-vehicle apparatus 1C via the communicator 440, for example, the device control processor 411 may cause the display 430 to display the instruction to capture the load image, the method of capturing the load image, and the sample of the load image.

In the fourth example embodiment, the device control processor 411 may transmit the load image captured by the imager 450 to the in-vehicle apparatus 1C in accordance with the application program.

<Process by In-Vehicle Apparatus 1C and Portable Device 400C>

Figure 19:
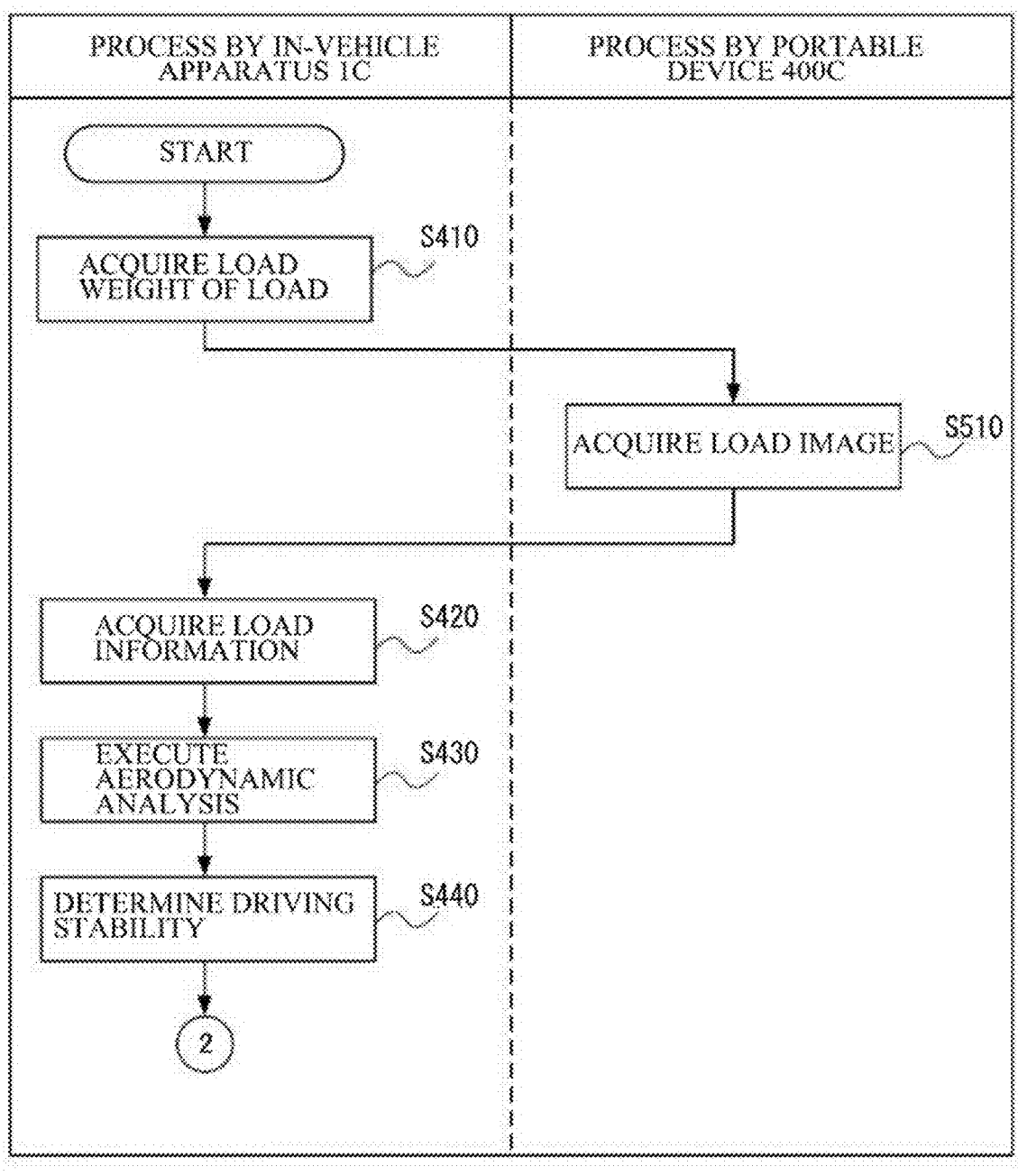
FIG. 19 is a flowchart of a process to be performed by the in-vehicle apparatus illustrated in FIG. 16.

A flow of a process to be performed by the in-vehicle apparatus 1C and the portable device 400C will now be described with reference to FIGS. 19 and 20.

The control processor 16C may send the instruction to acquire the load weight of the load to the load weight information obtainer 11 to cause the load weight information obtainer 11 to acquire the load weight of the load (Step S410).

The control processor 16C may send the instruction to acquire the load image of the load to the portable device 400C via the communicator 40.

The device control processor 411 may acquire the load image of the load from the imager 450 (Step S510), and transmit the acquired load image to the in-vehicle apparatus 1C.

The control processor 16C may transmit the load image acquired in Step S510 to the load information obtainer 12C to cause the load information obtainer 12C to acquire the load information (Step S420).

The control processor 16C may transmit the load information acquired in Step S420 to the aerodynamic analyzer 13 to cause the aerodynamic analyzer 13 to execute the aerodynamic analysis (Step S430).

The control processor 16C may transmit the load weight acquired in Step S410 and the result of the aerodynamic analysis acquired in Step S430 to the driving stability determiner 14 to cause the driving stability determiner 14 to determine the driving stability (Step S440).

Figure 20:
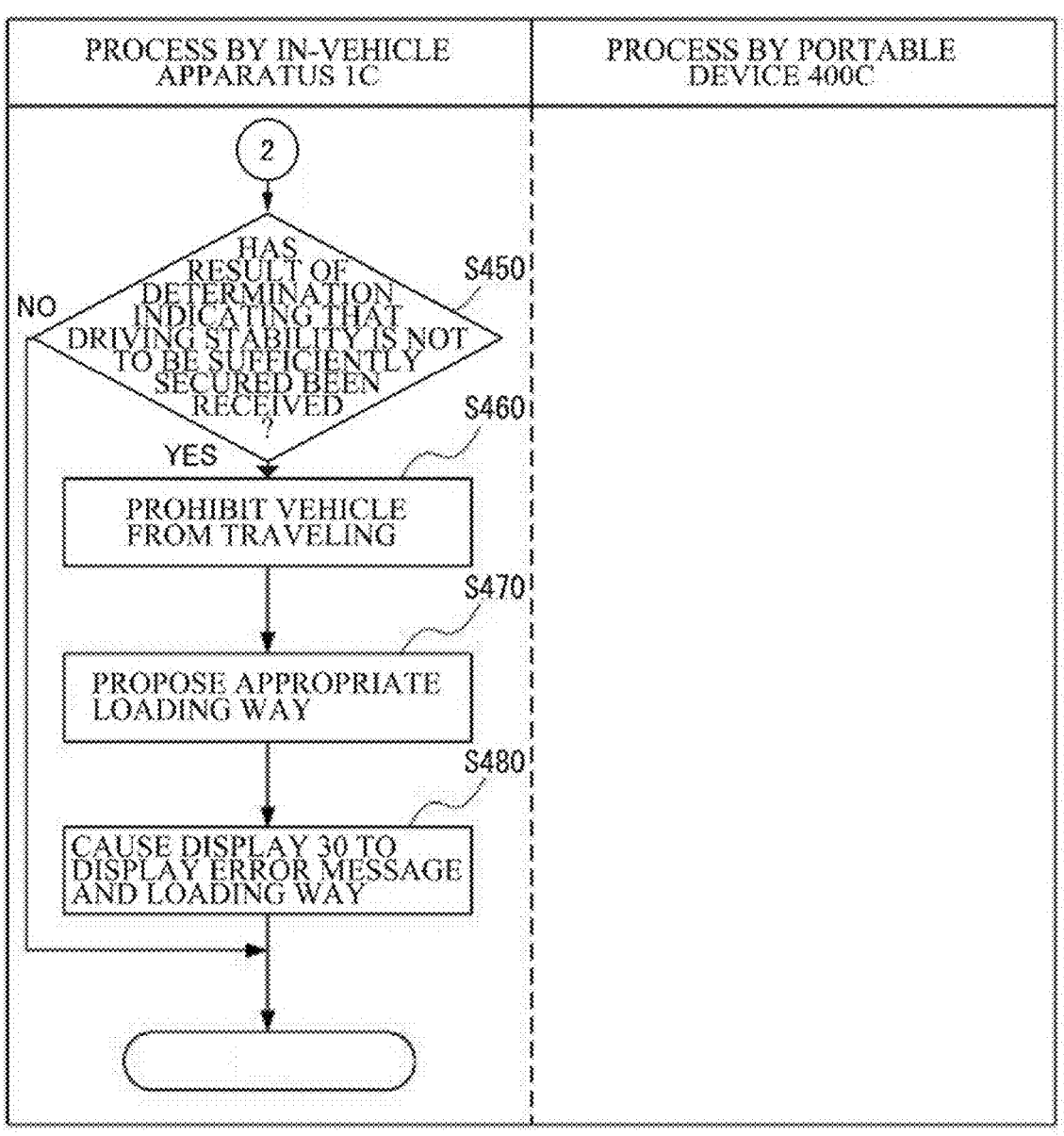
FIG. 20 is a flowchart of the process to be performed by the in-vehicle apparatus illustrated in FIG. 16.

As illustrated in FIG. 20, the control processor 16C may determine whether the result of the determination indicating that the driving stability is not to be sufficiently secured in the travel of the vehicle has been received from the driving stability determiner 14 (Step S450).

When determining that the result of the determination indicating that the driving stability is not to be sufficiently secured in the travel of the vehicle has not been received from the driving stability determiner 14 (Step S450: NO), the control processor 16C may end the process.

When determining that the result of the determination indicating that the driving stability is not to be sufficiently secured in the travel of the vehicle has been received from the driving stability determiner 14 (Step S450: YES), the control processor 16C may cause the process to proceed to Step S460.

The control processor 16C may send the instruction to prohibit the vehicle from traveling to the vehicle control apparatus 100 (Step S460).

The control processor 16C may transmit the load weight acquired in Step S410 and the load information acquired in Step S420 to the proposer 15 to cause the proposer 15 to propose the appropriate loading way (Step S470).

The control processor 16C may cause the display 30 to display an error message and the appropriate loading way received from the proposer 15 (Step S480), and end the process.

Workings and Effects

As described above, the in-vehicle apparatus 1C according to the fourth example embodiment may acquire the load image of the load from the portable device 400C in which the application program adapted to acquire the load image and transmit the load image is installed.

That is, the in-vehicle apparatus 1C may send the instruction to acquire the load image to the portable device 400C and acquire the load image of the load from the portable device 400C.

When receiving the instruction to acquire the load image from the in-vehicle apparatus 1C, for example, the portable device 400C may cause the display 430 to display the instruction to capture the load image, the method of capturing the load image, and a sample of the load image in accordance with the application program.

In this way, the in-vehicle apparatus 1C makes it possible to notify the user of detailed notes about capturing the load image.

This enables the user to easily recognize the reference of a load image necessary to calculate the specific power consumption.

Further, the load image necessary to acquire the load information is surely obtainable if the user captures a load image in accordance with the instruction displayed on the display 430.

The portable device 400C may automatically transmit the captured load image to the in-vehicle apparatus 1C in accordance with the application program.

This saves the user's effort of transmitting the load image.

Modification Example 1

In Modification Example 1, the in-vehicle apparatus 1B according to the example embodiment described above may acquire the load information based on both of the load image received from the portable device 400 and the load image captured by the camera installed in the vehicle when the load image received from the portable device 400 partially lacks, for example.

That is, when the load image captured by the user partially lacks, the in-vehicle apparatus 1B may cause the camera installed in the vehicle to capture the image of the lacking part of the load in order to complement the load image.

This enables the load information obtainer 12B of the in-vehicle apparatus 1B to acquire the load information based on the complemented load image. It is therefore possible for the in-vehicle apparatus 1B to always acquire accurate load information.

Modification Example 2

In Modification Example 2, the in-vehicle apparatus 1A according to the example embodiment described above may cause the display 30 to display an actual specific power consumption together with the specific power consumption calculated by the specific power consumption calculator 18 when the vehicle reaches the destination, for example.

In this way, the in-vehicle in-vehicle apparatus 1A makes it possible to demonstrate reliability of the calculated specific power consumption to the user.

Modification Example 3

In Modification Example 3, the in-vehicle apparatuses 1, 1A, 1, and 1C according to the example embodiments described above may each determine the appropriate loading way based on machine learning.

For example, the proposer 15 may determine the appropriate loading way using a trained model based on teaching data including the load image and the information on the actual specific power consumption uploaded to the server by the user.

In this way, the proposer 15 makes it possible to propose the appropriate loading way to avoid the deterioration in specific power consumption to the user.

In some embodiments, the in-vehicle apparatus 1A according to the example embodiment described above may calculate the specific power consumption based on machine learning.

For example, the specific power consumption calculator 18 may determine the specific power consumption using a trained model based on teaching data including the load image and the information on the actual specific power consumption uploaded to the server by the user.

This enhances the accuracy in calculating the specific power consumption. It is therefore possible to present the user with the route information including an accurate charging timing in the travel from the departure point to the destination.

In some embodiments, the user who has uploaded the load image and the information on the actual specific power consumption to the server may be given with a reward.

This makes it possible to collect the load image and the information on the actual specific power consumption from a greater number of users, enhancing the accuracy of the trained model.

Modification Example 4

The preset information stored in the memory 20 of the in-vehicle apparatus 1A according to the example embodiment described above may be changed to facilitate mounting of the in-vehicle apparatus 1A on a gasoline-fueled vehicle or a hybrid vehicle.

For example, the reference specific power consumption and the rate of deterioration in specific power consumption stored in the preset information may be changed to a reference specific fuel consumption and a rate of deterioration in specific fuel consumption of a gasoline-fueled vehicle on which the in-vehicle apparatus 1A is mounted.

The specific power consumption calculator 18 may calculate a specific fuel consumption of the gasoline-fueled vehicle based on the reference specific fuel consumption and the rate of deterioration in specific fuel consumption acquired from the preset information, for example.

The route information retriever 19 may calculate the cruising range based on a current gasoline residual amount and the specific fuel consumption calculated by the specific power consumption calculator 18, for example.

The route information retriever 19 may retrieve a traveling route from the departure point to the destination via a gasoline filling facility located within the cruising range, based on the calculated cruising range, map information, information on locations of gasoline filling facilities, and the information on the departure point and the destination.

This facilitates mounting of the in-vehicle apparatus 1A on the gasoline-fueled vehicle or the hybrid vehicle.

Modification Example 5

In Modification Example 5, the portable device 400C according to the example embodiment described above may execute the process adapted to determine the driving stability in accordance with an application program, for example.

For instance, the portable device 400C may execute the process adapted to acquire the load information from the captured load image, the process adapted to execute the aerodynamic analysis based on the load information, and the process adapted to determine the driving stability based on the result of the aerodynamic analysis and the load weight of the load acquired from the in-vehicle apparatus 1C.

This reduces a processing load on the processor 10C of the in-vehicle apparatus 1C.

The reduction in the processing load on the processor 10C of the in-vehicle apparatus 1C leads to a reduction in the amount of electric consumption of the in-vehicle apparatus 1C.

In some embodiments, it is possible to implement the in-vehicle apparatus 1 of the example embodiment of the disclosure by recording the process to be executed by the load information obtainer 12, the aerodynamic analyzer 13, the driving stability determiner 14, the proposer 15, and the control processor 16 of the in-vehicle apparatus 1 on a non-transitory recording medium readable by a computer system, and causing the computer system to load the program recorded on the non-transitory recording medium onto the load information obtainer 12, the aerodynamic analyzer 13, the driving stability determiner 14, the proposer 15, and the control processor 16 of the in-vehicle apparatus 1 to execute the program.

The computer system as used herein may encompass an operating system (OS) and hardware such as a peripheral device.

In addition, when the computer system utilizes a World Wide Web (WWW) system, the "computer system" may encompass a website providing environment (or a website displaying environment).

The program may be transmitted from a computer system that contains the program in a storage device or the like to another computer system via a transmission medium or by a carrier wave in a transmission medium.

The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above.

The program may be a so-called differential file (differential program) configured to implement the operation by a combination of a program already recorded on the computer system.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to one or more of the example embodiments of the disclosure described above, it is possible to present the user with the level of deterioration in driving stability of the vehicle by detecting the size and weight of the load placed on the roof carrier or the like of the vehicle.

One or more of the load weight information obtainer 11, the load information obtainer 12, the aerodynamic analyzer 13, the driving stability determiner 14, the proposer 15, and the control processor 16 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the load weight information obtainer 11, the load information obtainer 12, the aerodynamic analyzer 13, the driving stability determiner 14, the proposer 15, and the control processor 16 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the load weight information obtainer 11, the load information obtainer 12, the aerodynamic analyzer 13, the driving stability determiner 14, the proposer 15, and the control processor 16 illustrated in FIG. 2.

The invention claimed is:

1. An in-vehicle apparatus to be applied to a vehicle, the in-vehicle apparatus comprising:

a load weight information obtainer configured to acquire a load weight of a load placed on a roof rail or a roof carrier of the vehicle;

a load information obtainer configured to acquire load information including a size and a shape of the load from image data on the load;

an aerodynamic analyzer configured to execute an aerodynamic analysis based on the load information acquired by the load information obtainer;

a driving stability determiner configured to determine driving stability in travel of the vehicle based on at least the load weight and a result of the aerodynamic analysis executed by the aerodynamic analyzer;

a control processor configured to perform control adapted to prohibit the vehicle from traveling when the driving stability determiner determines that the driving stability is not to be sufficiently secured in the travel of the vehicle; and a proposer configured to give a proposal on an appropriate loading way to place the load on the vehicle.

2. The in-vehicle apparatus according to claim 1, further comprising:

a loading way determiner configured to determine whether the loading way has been improved in accordance with the proposal given by the proposer;

a specific power consumption calculator configured to calculate a specific power consumption of the vehicle based on the load weight and the result of the aerodynamic analysis executed by the aerodynamic analyzer when the loading way determiner determines that the loading way has been improved; and a route information retriever configured to retrieve route information including a charging timing in the travel of the vehicle from a departure point to a destination, based on a current amount of charge and a result of calculating by the specific power consumption calculator.

3. The in-vehicle apparatus according to claim 1, further comprising a load image obtainer configured to incorporate an image of a load captured by a portable device, wherein the load information obtainer is configured to acquire the size and the shape of the load from the image of the load incorporated by the load image obtainer.

4. The in-vehicle apparatus according to claim 3, further comprising a communicator configured to communicate with the portable device, wherein the communicator is configured to send a message requesting to provide the image of the load to the portable device.

5. The in-vehicle apparatus according to claim 1, further comprising a display configured to display information, wherein the display is configured to display an error message and information on the loading way when the driving stability determiner determines that the driving stability is not to be sufficiently secured in the travel of the vehicle.

6. An in-vehicle apparatus to be applied to a vehicle, the in-vehicle apparatus comprising:

one or more processors; and one or more memories communicably coupled to the one or more processors, wherein the one or more processors are configured to acquire a load weight of a load placed on a roof rail or a roof carrier of the vehicle, acquire load information including a size and a shape of the load from image data on the load, execute an aerodynamic analysis based on the load information, determine driving stability in travel of the vehicle based on at least the load weight and a result of the aerodynamic analysis, perform control adapted to prohibit the vehicle from traveling when the driving stability is determined not to be sufficiently secured in the travel of the vehicle, and propose an appropriate loading way to place the load on the vehicle.

* * * * *